(12) United States Patent
Markham et al.

(10) Patent No.: US 7,984,625 B2
(45) Date of Patent: Jul. 26, 2011

(54) TEMPERATURE COMPENSATION FOR SHAPE-INDUCED IN-PLANE STRESSES IN GLASS SUBSTRATES

(75) Inventors: Shawn Rachelle Markham, Harrodsburg, KY (US); Gautam Meda, Corning, NY (US); Douglas Gregg Neilson, Wilmington, NC (US); Daniel Arthur Nolet, Danville, KY (US); Robert A Novak, Lexington, KY (US)

(73) Assignee: Corning Incorporated, Corning, NY (US)

( * ) Notice: Subject to any disclaimer, the term of this patent is extended or adjusted under 35 U.S.C. 154(b) by 687 days.

(21) Appl. No.: 11/903,072

(22) Filed: Sep. 20, 2007

(65) Prior Publication Data

US 2008/0066498 A1 Mar. 20, 2008

Related U.S. Application Data

(60) Provisional application No. 60/845,924, filed on Sep. 20, 2006.

(51) Int. Cl.
*C03B 18/02* (2006.01)
*C03B 18/04* (2006.01)
*C03B 17/06* (2006.01)

(52) U.S. Cl. ............. 65/29.12; 65/29.19; 65/90; 65/95; 65/97

(58) Field of Classification Search ............... 65/90–95, 65/29.12–29.19
See application file for complete search history.

(56) References Cited

U.S. PATENT DOCUMENTS

| 4,188,200 | A | * | 2/1980 | Horn ............................... 65/90 |
| 6,758,064 | B1 | * | 7/2004 | Kariya ............................ 65/91 |
| 6,986,268 | B2 | | 1/2006 | Lee |
| 2006/0081009 | A1 | | 4/2006 | Maldonado ........................ 17/6 |
| 2006/0249553 | A1 | | 11/2006 | Ukrainczyk |
| 2006/0261118 | A1 | | 11/2006 | Cox et al. ............................ 35/10 |
| 2006/0280920 | A1 | | 12/2006 | Abbott, III |
| 2007/0028681 | A1 | | 2/2007 | Goforth et al. |
| 2007/0062219 | A1 | | 3/2007 | Blevins et al. |

FOREIGN PATENT DOCUMENTS

| JP | 2001-130920 | 5/2001 |
| JP | 2001-180957 | 7/2001 |
| WO | WO2005/055284 | 6/2005 |

OTHER PUBLICATIONS

Eisenhart, L.P., "An Introduction To Differential Geometry With Use Of The Tensor Calculus", Princeton University Press, 1947, p. 54.

(Continued)

*Primary Examiner* — Matthew J Daniels
*Assistant Examiner* — Jodi Cohen
(74) *Attorney, Agent, or Firm* — Siwen Chen; Maurice M. Klee

(57) ABSTRACT

Methods of fabricating glass sheets (13) are provided in which the sheets are cut from a glass ribbon (15) composed of a glass having a setting zone temperature range (SZTR). As the glass is drawn, it passes through the SZTR (31) and an across-the-ribbon temperature distribution is produced at least one longitudinal position along the ribbon to compensate for in-plane stress induced in the sheets (13) when flattened. Through such thermal compensation, glass sheets (13) are produced which exhibit controlled levels of distortion when cut into sub-pieces and thus are suitable for use as substrates in the manufacture of, for example, flat panel displays, e.g., LCD displays.

9 Claims, 13 Drawing Sheets

OTHER PUBLICATIONS

Timoshenko et al., "Theory Of Plates And Shells", McGraw-Hill Book Company, Second Edition, 1959, p. 47.
Boley et al, "Theory Of Thermal Stresses", Dover Publications, Mineola, NY, 1960, pp. 272-277.
Hagy et al., "Viscous Flow In Glass-To-Metal Seals", Journal Of The American Ceramic Society, vol. 40, pp. 58-62.
Findley et al, "Creep And Relaxation Of Nonlinear Viscoelastic Materials", Dover Publications, 1989, pp. 53, and 81-82.
ASTM F-144-80, "Standard Practice For Making Reference Glass-Metal Sandwich Seal And Testing For Expansion Characteristics By Polarimetric Methods", pp. 1-5.

* cited by examiner

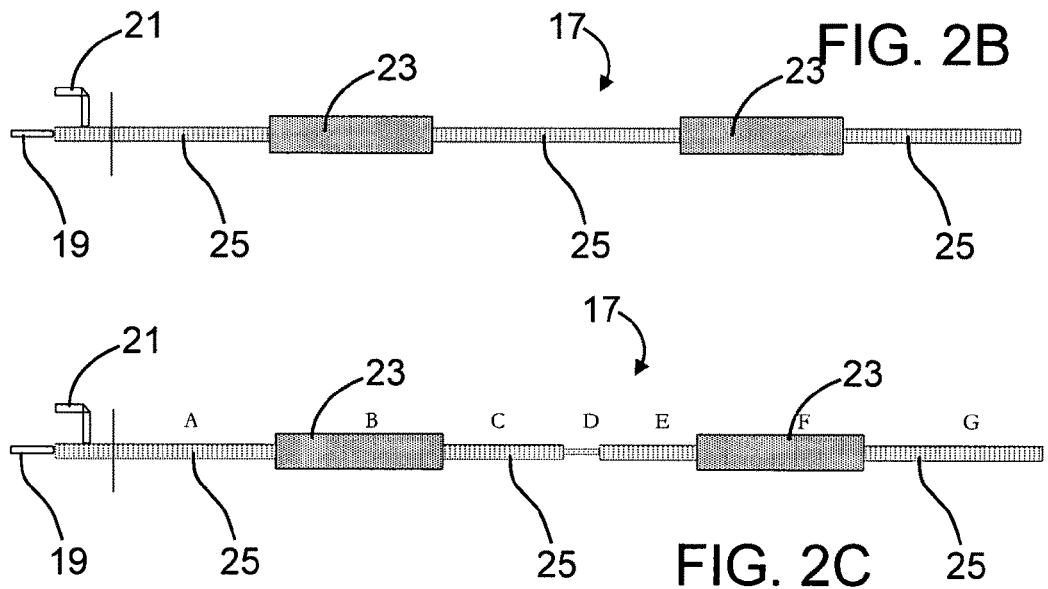
FIG. 2B
FIG. 2C
FIG. 4
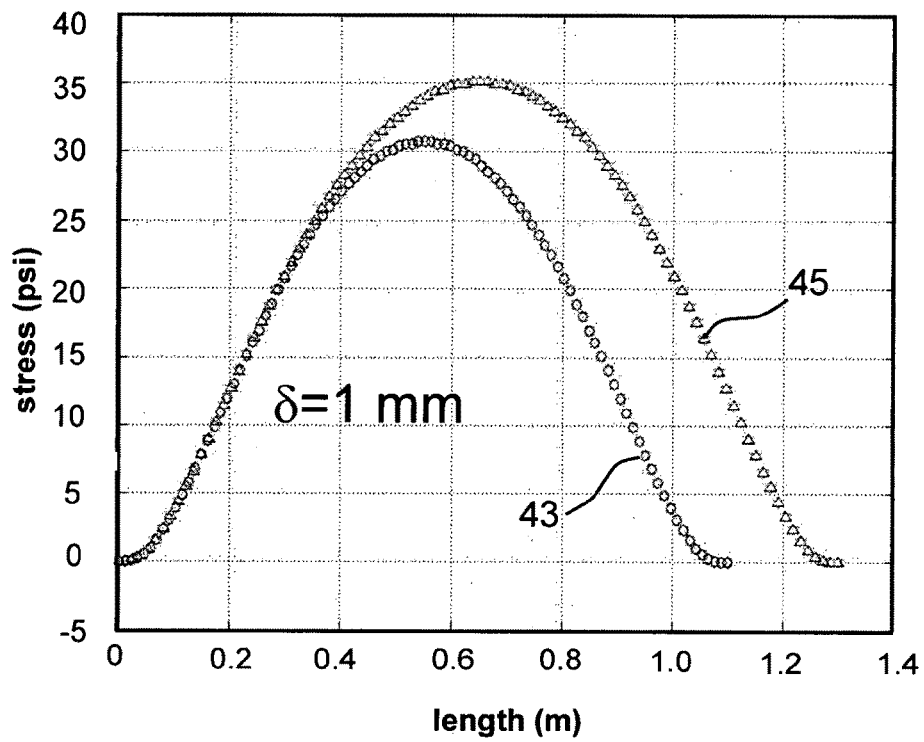

FIG. 21
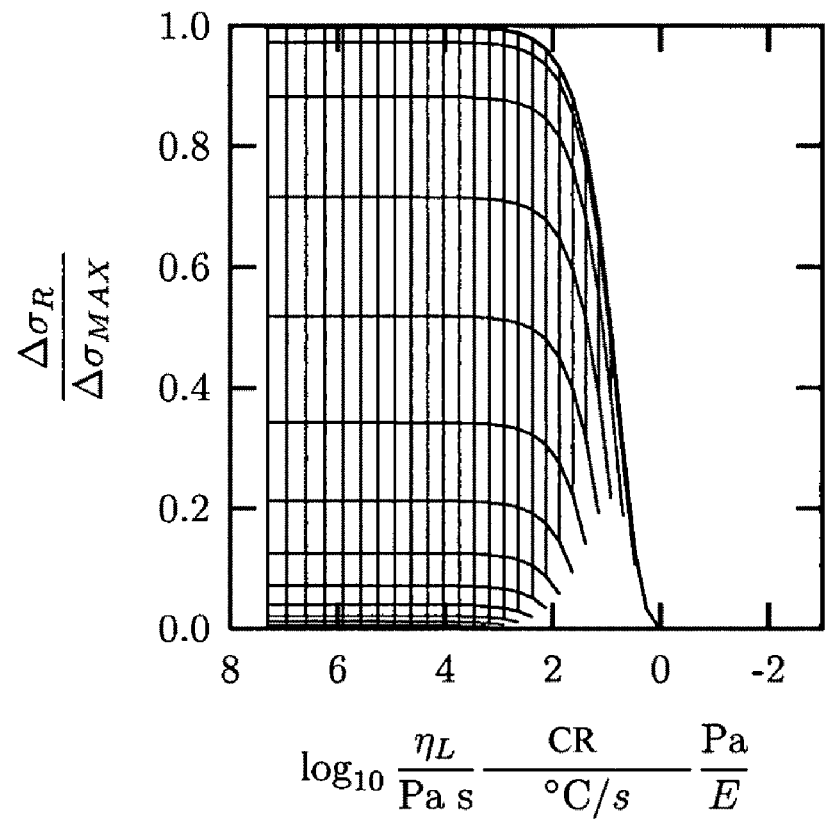
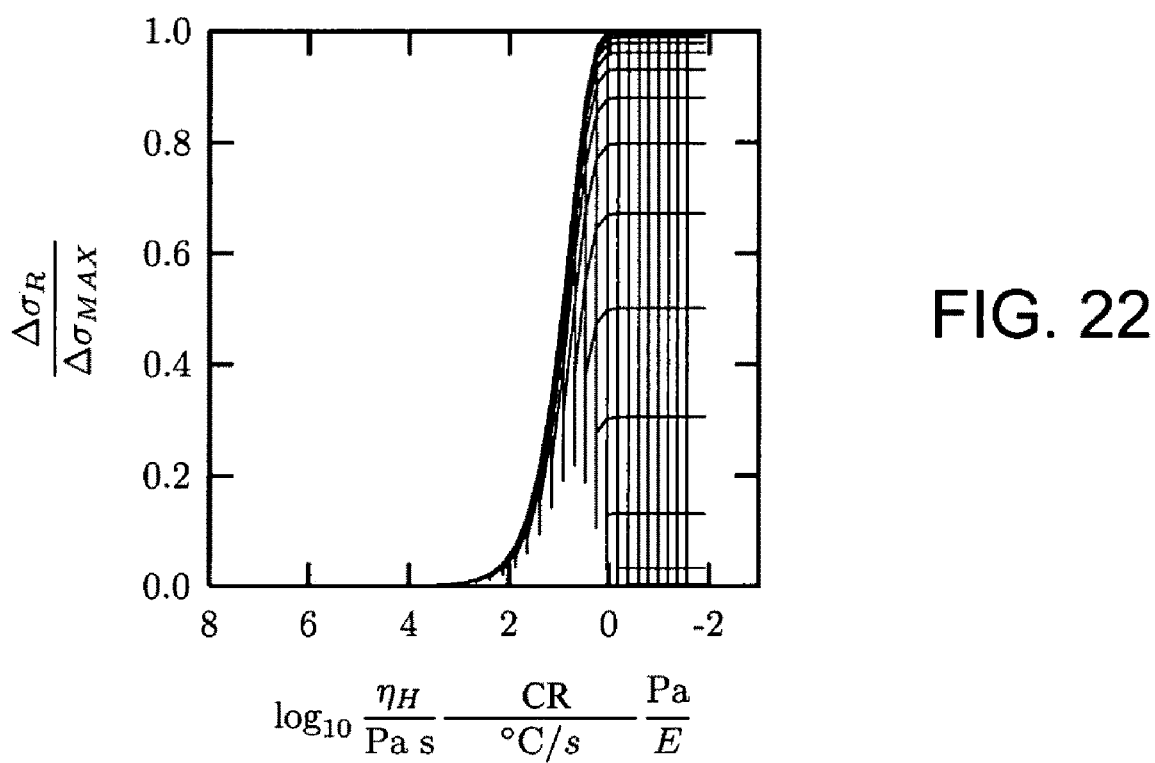
FIG. 22

TEMPERATURE COMPENSATION FOR SHAPE-INDUCED IN-PLANE STRESSES IN GLASS SUBSTRATES

CROSS-REFERENCE TO RELATED APPLICATIONS

This application claims the benefit of priority under 35 U.S.C. §119(e) of U.S. Provisional Application Ser. No. 60/845,924 filed on Sep. 20, 2006, the content of which is relied upon and incorporated herein by reference in its entirety.

I. TECHNICAL FIELD

This invention relates to the manufacture of glass sheets such as the glass sheets used as substrates in display devices such as liquid crystal displays (LCDs). More particularly, the invention relates to methods for reducing the amount of distortion which glass substrates exhibit when cut into parts during, for example, the manufacture of such displays.

II. BACKGROUND

Display devices are used in a variety of applications. For example, thin film transistor liquid crystal displays (TFT-LCDs) are used in notebook computers, flat panel desktop monitors, LCD televisions, and Internet and communication devices, to name only a few.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate or a sub-piece of a substrate. At various points in such processes, the substrate is divided into parts along cut lines (see, for example, the discussion of the "assemble and cut" and "cut and assemble" processes in Section V(B) below).

Such cutting changes the stress distribution within the glass, specifically, the in-plane stress distribution seen when the glass is vacuumed flat. Even more particularly, the cutting relieves stresses at the cut line such that the cut edge is rendered traction free. Such stress relief in general results in changes in the vacuumed-flat shape of the glass sub-pieces, a phenomenon referred to by display manufacturers as "distortion." Although the amount of shape change is typically quite small, in view of the pixel structures used in modern displays, the distortion resulting from cutting can be large enough to lead to substantial numbers of defective (rejected) displays. Accordingly, the distortion problem is of substantial concern to display manufacturers and specifications regarding allowable distortion as a result of cutting can be as low as 2 microns or less.

The present invention is directed to controlling distortion and, in particular, to methods for controlling distortion in sub-pieces cut from glass sheets produced by a drawing process, such as, a downdraw, fusion downdraw, updraw, float, or similar process.

III. SUMMARY

In accordance with the invention, a temperature range along the glass ribbon produced by a drawing process has been identified which plays a critical role in reducing distortion levels. As the glass is being drawn, it passes through this critical range and the across-the-ribbon temperature distributions and/or the across-the-ribbon shapes associated with this range are key determinants of the amount of distortion exhibited by sub-pieces cut from glass sheets produced from the ribbon.

This temperature range is referred to herein as the "setting zone temperature range" or SZTR, and methods by which the range can be determined for any particular glass composition and drawing rate are discussed below in Section V(D)(3). The term "setting temperature" has previously been used in the glass making art in connection with glass-to-metal seals. See H. E. Hagy and H. N. Ritland, in "Viscous flow in glass-to-metal seals," Journal of the American Ceramic Society, Vol. 40, pp. 58-62. See also ASTM F-144-80. The setting temperature values determined in accordance with these references are on the order of 25° C. above the glass' strain point. The setting zone temperature range of the present invention, on the other hand, occurs at substantially higher temperatures. A primary reason for this difference is the high rate of cooling which a glass ribbon experiences in a drawing process. This high rate of cooling causes the glass to take a "set" at temperatures well above the strain point, e.g., at temperatures approximately 75-150° C. above the strain point for the types of glasses typically used for LCD applications.

In view of the foregoing, the invention, in accordance with a first aspect, provides a method for controlling the distortion exhibited by sub-pieces cut from glass sheets (13) cut from a glass ribbon (15) produced by a drawing process (e.g., a fusion downdraw process) having a drawing rate, said glass having a setting zone temperature range (SZTR) for said drawing rate, said glass ribbon having a centerline, and said method comprising:

(a) determining an across-the-ribbon shape for the ribbon at one or more longitudinal positions along the ribbon where the glass at the centerline of the ribbon has a temperature within the SZTR (e.g., a position within, for example, region 31 in FIG. 1), and (b) producing an across-the-ribbon temperature distribution at one or more longitudinal positions along the ribbon (e.g., a position which is preferably within the SZTR) based on at least one of the one or more across-the-ribbon shapes determined in step (a) so that a population of glass sheets cut from the ribbon (e.g., a population of 50 sequential sheets) has, for each sheet in the population, a maximum distortion of 2 microns for sub-pieces cut from the sheet, where each sheet in the population has an area greater than or equal to 0.25 square meters.

In accordance with a second aspect, the invention provides a method for controlling the distortion exhibited by sub-pieces cut from glass sheets (13) cut from a glass ribbon (15) produced by a drawing process having a drawing rate, said glass having a setting zone temperature range (SZTR) for said drawing rate, said glass ribbon having a centerline, and said method comprising producing an across-the-ribbon temperature distribution at one or more longitudinal positions along the ribbon where the glass at the centerline of the ribbon has a temperature within the SZTR based on a representative shape for the glass sheets under substantially gravity-free conditions (e.g., an average shape measured and/or calculated under substantially gravity-free conditions for a set of glass sheets produced by the drawing process) so that a population of glass sheets cut from the ribbon (e.g., a population of 50 sequential sheets) has, for each sheet in the population, a maximum distortion of 2 microns for sub-pieces cut from the sheet, where each sheet in the population has an area greater than or equal to 0.25 square meters.

In accordance with a third aspect, the invention provides method for controlling the distortion exhibited by sub-pieces cut from glass sheets (13) cut from a glass ribbon (15) produced by a drawing process having a drawing rate, said ribbon having a centerline, and said method comprising:

(i) determining a setting zone temperature range (SZTR) for the glass for said drawing rate; and (ii) producing an across-the-ribbon temperature distribution at one or more longitudinal positions along the ribbon where the glass at the centerline of the ribbon has a temperature within the SZTR based on a representative stress distribution for the glass sheets under vacuumed flat conditions (e.g., an average stress distribution measured and/or calculated under vacuumed flat conditions for a set of glass sheets produced by the drawing process) so that a population of glass sheets cut from the ribbon (e.g., a population of 50 sequential sheets) has, for each sheet in the population, a maximum distortion of 2 microns for sub-pieces cut from the sheet, where each sheet in the population has an area greater than or equal to 0.25 square meters.

In accordance with a fourth aspect, the invention provides a method for controlling the distortion exhibited by sub-pieces cut from glass sheets (13) cut from a glass ribbon (15) produced by a drawing process comprising:

(a) obtaining one dimensional or two-dimensional data for glass sheets and/or sub-pieces produced by the process (e.g., shape, stress, or equivalent data);

(b) decomposing said data into components, said components comprising at least a first component (e.g., spatial component 69 in FIG. 17) and a second component (e.g., spatial component 71 in FIG. 17), wherein:

(i) the first component has a first spatial frequency content and the second component has a second spatial frequency content; and (ii) the first spatial frequency content corresponds to lower spatial frequencies than the second spatial frequency content; and (c) using the first component in the selection of at least one process parameter used in the drawing process (e.g., an across-the-ribbon temperature distribution in the SZTR or at some other position along the length of the ribbon).

In accordance with other aspects, the invention provides iterative methods for determining across-the-ribbon temperature distributions that achieve controlled levels of distortion, including iterative methods that employ computer modeling of the effects of across-the-ribbon temperature distributions on across-the-ribbon shapes.

For ease of presentation, the present invention is described and claimed in terms of the production of glass sheets. It is to be understood that throughout the specification and claims, the word "glass" is intended to cover both glass and glass-ceramic materials.

Also, the phrase "across-the-ribbon temperature distribution" means a temperature distribution at the surface of the glass ribbon. Such temperature distributions can be measured by various techniques known in the art, such as with pyrometers and/or contact thermocouples.

Further, the phrase "in-plane shape change" refers to the change in shape which a sheet of glass exhibits as a result of being flattened against a plane surface, and the word "distortion" refers to the change in shape (specifically, shape when vacuum flattened) of a sub-piece that occurs when the sub-piece is cut from a larger glass sheet.

Quantitatively, the "maximum distortion for sub-pieces cut from a sheet" is determined using distance measurements performed under vacuumed flat conditions before and after cutting the sheet into two sub-pieces of equal areas. Specifically, for each of the two sub-pieces, the maximum change in distance is determined between any two of the sub-piece's four corner points, including changes in the diagonal distances, before and after cutting under vacuumed flat conditions, i.e., measurements are made under vacuumed flat conditions on the uncut sheet and then made on the individual sub-pieces, again under vacuumed flat conditions. The maximum of these two maximums is then the "maximum distortion for sub-pieces cut from that sheet." Some manufacturers of display panels currently use somewhat different quantitative definitions of maximum distortion than the foregoing definition. However, the foregoing definition correlates with these other definitions, and the foregoing definition has the advantage that it can be readily determined in all cases.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

IV. BRIEF DESCRIPTION OF THE DRAWINGS

FIG. 1 is a schematic view of a fusion glass fabrication apparatus in accordance with an example embodiment of the invention. The longitudinal position of the SZTR (31) is schematically illustrated in this figure.

FIGS. 2A, 2B, and 2C are schematic drawings of cooling bayonets that can be used in producing across-the-ribbon temperature distributions.

FIG. 4 is a drawing showing the edge stresses developed by the sheet of FIG. 3 when flattened.

FIG. 21 is a view of FIG. 20 along the $\eta_L$ axis of the setting zone parameter (SZP).

FIG. 22 is a view of FIG. 20 along the $\eta_H$ axis of the setting zone parameter (SZP).

Figure 1:
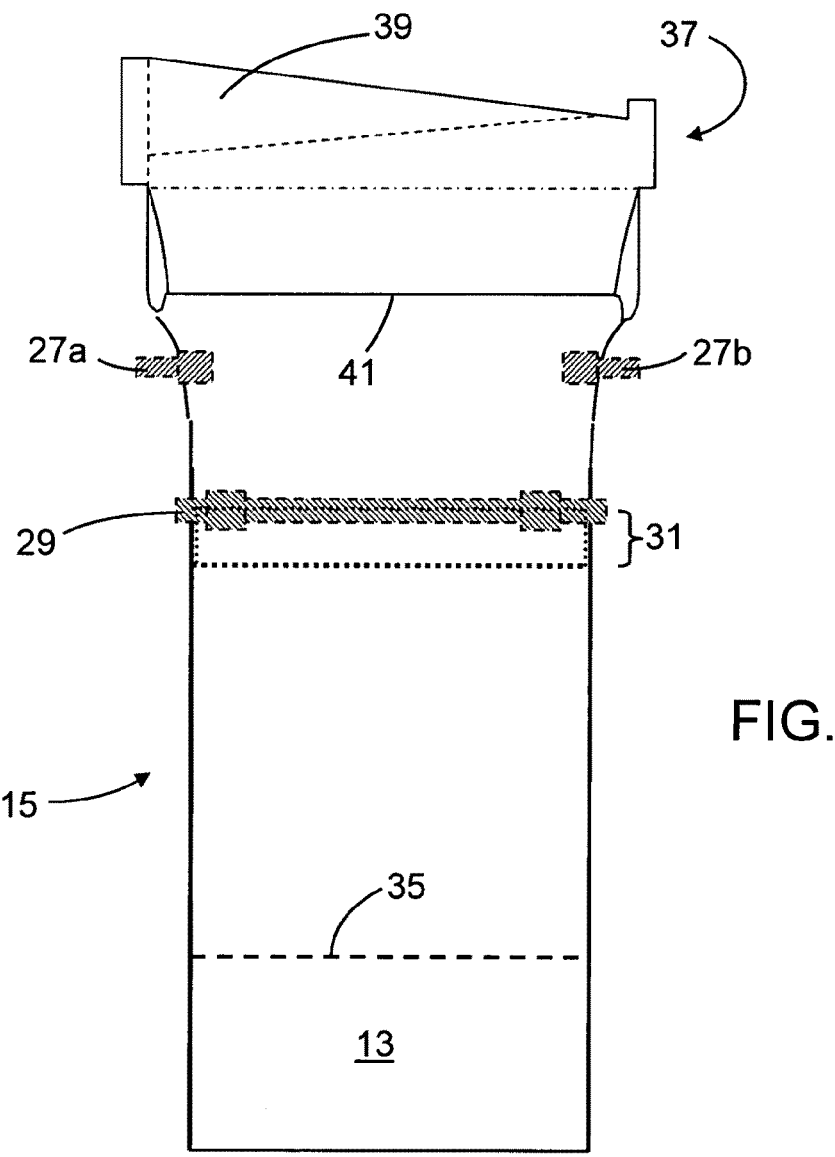

The reference numbers used in the figures correspond to the following:

13 glass sheet (glass substrate)
15 glass ribbon
17 cooling bayonet
19 inlet
21 exit
23 emissivity coating
25 emissivity coating (different emissivity than coating 23)
27a,b edge rollers
29 pulling rolls
31 region of ribbon corresponding to the SZTR
35 score line
37 isopipe, i.e., forming structure used in a downdraw fusion process
39 cavity in isopipe for receiving molten glass
41 root of isopipe

V. DETAILED DESCRIPTION

(A) Stresses in Glass Substrates Used to Make Display Panels

Glass substrates used in the manufacture of display panels, e.g., liquid crystal display panels, have the common characteristic of being thin, e.g., the substrate thickness is at most 1.1 millimeters, more typically, about 0.7 millimeters, and in the future, may be even thinner. Because of this thinness, substrates can relieve long range, in-plane stress by buckling, and they do so both in their finished state and while they are being manufactured.

(B) Buckling of Finished Substrates and Its Role in Distortion

If a finished glass substrate is placed in a gravity-free or substantially gravity-free environment (e.g., in a fluid having the same density as the glass), the substrate will have essentially no long range, in-plane stresses. Rather, through buckling, the substrate will adopt a shape in which long range, in-plane stresses are relieved. For a typical substrate for use in manufacturing flat panel displays, the long range, in-plane stresses that can be relieved by buckling are those having a spatial period greater than about 30 millimeters. Some short range stresses, e.g., stresses over in-plane distances of about 10 millimeters or less, may not be relieved, but over longer in-plane distances, the buckling mechanism will operate to substantially remove in-plane stress.

It should be noted that in terms of distortion (see below), the in-plane stresses that are important are those having spatial periods substantially longer than 30 millimeters. Specifically, the in-plane stresses which lead to distortion upon cutting of a substrate into sub-pieces are those having spatial periods longer than about one-quarter the width of the substrate, e.g., 250 millimeters for a 1 meter wide substrate. Because these spatial periods are much greater than 30 millimeters, in-plane stresses associated therewith are essentially fully relieved by buckling.

It should also be noted that in the general case, in-plane stresses in a substrate that is flattened have a two dimensional distribution. Such a distribution can be analyzed in terms of spatial components. In a gravity-free or substantially gravity-free condition, those components which have relatively low spatial frequencies (relatively long spatial periods) can be relieved by buckling, while those which have relatively high spatial frequencies (relatively short spatial periods) generally cannot. As discussed above, for typical substrates for flat panel displays, the transition between long spatial periods where buckling is effective to relieve in-plane stress and short spatial periods where buckling may not be effective, is generally in the 30 millimeter or above range. As used herein, "long range, in-plane stresses" are those components of the stress which have long spatial periods, e.g., in the 30 millimeter or above range.

The result of buckling is, of course, to produce a non-flat substrate shape. Thus, if a substrate would exhibit long range, in-plane stress when flattened, e.g., through the application of a vacuum (see below), then such a substrate when placed in a gravity-free or substantially gravity-free environment will have a non-flat shape. If taken out of that environment and placed on a flat surface (but not actively flattened against the surface), some in-plane stress will develop in the glass as a result of the action of gravity. Also, the shape will change, again through the action of gravity. Thus, a buckled, substantially stress-free finished substrate in a gravity-free or substantially gravity-free environment will become a buckled, stress-containing substrate on a flat surface as a result of gravity, but the buckling will be different from that in the gravity-free or substantially gravity-free state.

If the finished substrate is actively flattened against a flat surface either by being pulled towards the surface through the application of a vacuum from behind the surface (e.g., by being pulled onto a vacuum platen) or by being pushed against the flat surface by another flat surface (e.g., if the substrate is sandwiched between two flat platens), then the buckling will be removed, but in its place, the substrate will exhibit long-range, in-plane stress. Such long-range, in-plane stress will, in turn, result in long-range, in-plane strain, i.e., in long-range in-plane displacements of the substrate. Except in the case where the shape in the gravity-free environment is a "developable" shape (see Timoshenko, S., Woinowsky-Krieger, S., "Theory of Plates and Shells," McGraw-Hill Book Company, Second Edition, 1959, page 47 and Eisenhart, L. P., "An Introduction to Differential Geometry With Use of the Tensor Calculus," Princeton University Press, 1947, page 54), as in certain embodiments of the present invention (see below), the in-plane displacements will result in in-plane shape changes, e.g., fiducial marks on the surface of the substrate which would, for example, define a right angle in the gravity-free or substantially gravity-free environment will no longer define a right angle when the substrate is vacuumed onto a flat surface.

In the manufacturing of flat panel displays, substrates are vacuumed onto flat platens during processing (e.g., during photolithography) and are also sandwiched between two flat platens during, for example, assembly into panels, e.g., in a liquid crystal display, a substrate carrying a set of transistor arrays and a second substrate carrying a set of filter arrays are sandwiched between flat platens during assembly, with liquid crystal material being sealed between the transistor and filter arrays. Each time such flattening occurs, the substrate will exhibit in-plane shape change.

Such, in-plane shape change upon flattening can, in general, be tolerated if it remains the same throughout the panel manufacturing process. For example, if a set of transistor arrays (e.g., a set of 9 arrays in a 3×3 matrix) is formed on a first substrate while the substrate is in a flattened condition (e.g., while the substrate is being pulled onto a vacuum platen), a corresponding set of filter arrays is formed on a second substrate which is also in a flattened condition, and then the first and second substrates are sandwiched together between flat platens and cemented to form a set of panels, in-plane shape changes of the substrates as a result of flattening does not generally reduce yields because the same in-plane shape changes occur during array formation and during assembly. That is, during assembly, the transistor and filter arrays will exhibit the same in-plane shape changes as they exhibited when they were formed, and thus they can be accurately aligned with one another. When individual panels are cut from the assembly, because the components of such panels are firmly cemented together prior to the cutting, the shape change of the transistor and filter arrays will be essentially the same.

Display manufacturers refer to a process of the foregoing type as "assemble and cut," and for this process, in-plane shape changes as a result of flattening are not currently considered as substantially increasing manufacturing costs.

However, display manufacturers also use a process known as "cut and assemble." In this process, a set of transistor arrays is formed on a substrate while the substrate is flattened (e.g., 9 transistor arrays are formed in a 3×3 matrix). Thereafter, the substrate is cut into sub-pieces (e.g., into 3 columns, each having 3 transistor arrays). The same approach is followed for the filter arrays, i.e., filter arrays are formed on a substrate which is then cut into sub-pieces. Next, a sub-piece carrying transistor arrays (e.g., a column of 3 transistor arrays) is aligned with a sub-piece carrying filter arrays (e.g., a column of 3 filter arrays), and the sub-pieces are then flattened between platens and cemented. Finally, individual panels are cut from the assembled sub-pieces.

This "cut and assemble" process is often used when a new line or process is first being put into commercial production because it reduces waste, e.g., the process facilitates alignment of non-defective color filters and non-defective transistor arrays. In some cases, "cut and assemble" is used throughout the life of a display manufacturing process, while in others, a switchover to an "assemble and cut" process is made once defect levels have been reduced.

As in the "assemble and cut" process, cutting individual panels from assembled sub-pieces formed by a "cut and assemble" process does not generally present shape change problems since the cutting occurs after the components are firmly attached to one another, and thus the alignment of the transistor and filter arrays is maintained. However, the cutting of transistor and filter sub-pieces from substrates does present distortion problems.

This is because stresses are relieved at the cut lines and accordingly, when the sub-pieces are flattened during the assembly step, they do not, in general, generate the same in-plane stresses and therefore they exhibit different shape changes as a result of no longer being part of an intact substrate. If sufficiently large, such distortions can lead to unacceptable misalignments between the transistor and filter arrays.

Such distortion would not be as serious a problem in the manufacturing of flat panel displays if all sub-pieces exhibited exactly the same distortion since in such a case, at least in theory, the distortion could be taken into account in the display manufacturing process. However, sub-pieces do not in general exhibit the same distortion. This is so even when sub-pieces are cut from the same substrate, since if different parts of the substrate have different long range buckling patterns in a gravity-free or substantially gravity-free environment, then when the substrate is cut into sub-pieces along cut lines, different long range, in-plane stress distributions (corresponding to the different long range buckling patterns) will be relieved at the different cut lines and thus the final long range, buckling patterns of the individual sub-pieces in a gravity-free or substantially gravity-free environment will be different, and thus those individual sub-pieces will exhibit different distortions.

The solution to the above distortion problem is, of course, straightforward—if a substrate and/or a sub-piece of a substrate exhibits a low level of long range, in-plane stress when flattened, then it will also exhibit low levels of strain (displacement) under those conditions, and thus low levels of distortion. The challenge has not been in recognizing the ultimate source of the distortion problem, but rather has been in developing practical manufacturing processes which can achieve low levels of long-range, in-plane stresses in flattened substrates and/or sub-pieces. The present invention is addressed to such manufacturing processes.

(C) Across-the-Ribbon Shapes and Across-the-Ribbon Thermal Distributions

Typically, multiple sub-pieces are produced from a single substrate in a "cut and assemble" process. The single substrate, in turn, is typically produced by a continuous manufacturing process, such as, a downdraw (e.g., a fusion downdraw), updraw, or float process, which produces a ribbon of glass from which individual substrates are cut.

Such continuous manufacturing processes involve the melting and refining of raw materials to produce molten glass which is then formed into the ribbon by suitable forming equipment, e.g., an "isopipe" in the case of a downdraw process of the overflow type (see the discussion of FIG. 1 in Section V(D)(2) below). Once formed, the ribbon is cooled, which causes the glass making up the ribbon to undergo a transformation from a visco-elastic material in which stresses are rapidly relieved to a thin elastic material which can support tension stresses, but tends to respond to compression stresses by buckling.

Although the transformation from a visco-elastic material to an elastic material is a complex phenomenon, as a first approximation, the transformation can be considered to occur in a particular zone along the length of the ribbon (the transformation zone). The transformation zone lies in that portion of the ribbon where the glass is passing through its glass transition temperature range (GTTR).

Two characteristics of the ribbon in: the transformation zone are important with regard to the in-plane stress which a substrate cut from such a ribbon (and/or a sub-piece cut from the substrate) will exhibit when flattened: (1) the transverse shape of the ribbon (the across-the-ribbon shape) and (2) the ribbon's transverse temperature distribution (the across-the-ribbon temperature distribution). To a first approximation, the ribbon is substantially stress free in the transformation zone because it is, or has just been, a visco-elastic material where stresses are rapidly relieved. Similarly, and again to a first approximation, the effects of mechanical forces on the ribbon are secondary in the transformation zone, so that the primary considerations are the across-the-ribbon shape and the across-the-ribbon temperature distribution.

The simplest case (Case 1) is where the across-the-ribbon shape in the transformation zone is substantially flat and the across-the-ribbon temperature distribution in that zone is also substantially flat (i.e., substantially uniform). There being substantially no stress in the glass in this zone (see above), cooling the substantially flat temperature distribution to room temperature will, at least to a first approximation, generate substantially no in-plane stress in the glass (all parts of the glass will contract substantially equally upon cooling), and thus the shape at room temperature will, again to a first approximation, be substantially the same as in the transformation zone, namely, the shape will be substantially flat. (Note that because there is substantially no in-plane stress at room temperature, the shape will be substantially flat both under non-gravity conditions and under gravity conditions when the glass is supported by a flat surface.) A substantially flat shape, of course, means substantially no stress generation upon flattening, which means substantially no distortion of sub-pieces cut from a substrate, as is desired.

A substantially flat across-the-ribbon temperature distribution is a specific example of the more general case of a uniform across-the-ribbon temperature gradient (i.e., it is a uniform across-the-ribbon temperature gradient with zero slope). A uniform across-the-ribbon temperature gradient is, in turn, an example of the general case of a temperature distribution which produces a uniform across-the-ribbon thermal strain gradient. In particular, it is the temperature distribution that produces a uniform thermal strain gradient for a constant coefficient of thermal expansion (CTE). However, if the CTE is not constant, as is typically the case in the transformation zone, then an across-the-ribbon temperature gradient that is non-uniform is needed to achieve a uniform across-the-ribbon thermal strain gradient. See, for example, Boley, B. A., and Weiner, J. H., *Theory of Thermal Stresses*, Dover Publications, Mineola, N.Y., 1960, pages 272-277. In general, the combination of a substantially flat across-the-ribbon shape and a temperature distribution that produces a uniform across-the-ribbon thermal strain gradient produces, to a first approximation, a substantially flat shape at room temperature, the case of a flat across-the-ribbon temperature distribution being a specific example of this combination.

The next simplest case (Case 2) is a substantially flat across-the-ribbon temperature distribution in the transformation zone, but a non-flat across-the-ribbon shape in that zone. A non-flat shape in the transformation zone can result from the sheet having a non-flat shape in regions beyond the transformation zone where the glass is cooler and thus elastic. Such a non-flat shape in those cooler regions is, in effect, translated back to the transformation zone and imposed upon the glass in that zone as the glass undergoes its transformation from a visco-elastic material to an elastic material. As a result of this transformation, the imposed shape becomes "frozen" into the glass.

A variety of sources can cause the elastic portion of the ribbon to have a non-flat shape. First, a variety of mechanical forces act on the elastic portion of the ribbon, including forces associated with the drawing of the ribbon, e.g., forces imposed by pulling rolls, and forces associated with cutting substrates from the ribbon. Such forces can produce both long term shapes in the ribbon and shapes of short duration (e.g., shapes due to temporary vibrations in the ribbon). Commonly-assigned U.S. patent application Ser. No. 11/124,435, entitled "Ultrasonic Induced Crack Propagation in a Brittle Material", which was filed on May 6, 2005 in the name of L. Ukrainczyk, commonly-assigned U.S. patent application Ser. No. 11/131,125, entitled "Method and Apparatus for Separating a Pane of Brittle Material From a Moving Ribbon of the Material", which was filed on May 17, 2005 in the names of J. Cox, M. Joseph, and K. Morgan, and commonly-assigned U.S. patent application Ser. No. 11/150,747, entitled "Selective Contact with a Continuously Moving Ribbon of Brittle Material to Dampen or Reduce Propagation or Migration of Vibrations Along the Ribbon", which was filed on Jun. 10, 2005 in the name of J. S. Abbott III, discuss various mechanical systems that can play a role in determining the shape of the elastic portion of the ribbon and thus its shape in the transformation zone. The contents of the foregoing applications in their entireties are hereby incorporated herein by reference.

Second, although the across-the-ribbon temperature distribution may be substantially flat in the transformation zone and will be flat at room temperature, the distribution may be non-flat in between, and such a non-uniform across-the-ribbon temperature distribution will produce in-plane stresses in the elastic ribbon which can cause it to assume a non-flat shape. Depending on the overall structure of the system, such a non-flat shape can be fed back to the transformation zone and become frozen into the glass.

Third, the temperature distribution down the ribbon can generate local tension and compression zones in the ribbon which again can cause the ribbon to adopt a shape which can be fed back into the transformation zone. Indeed, as discussed in commonly-assigned PCT Patent Application No. PCT/US2004/039820, filed Nov. 29, 2004 and entitled "Method of Fabricating Low-Warp Flat Glass," the contents of which in their entirety are incorporated herein by reference, a down the ribbon temperature distribution can be effectively used to purposely produce tension zones in the GTTR to address the problem of curtain warp. Also, commonly-assigned U.S. patent application Ser. No. 11/233,565, entitled "Methods of Fabricating Flat Glass with Low Levels of Warp", which was filed on Sep. 22, 2005 in the names of C. Shay, R. Novak, and J. Blevins, discusses methods and apparatus for addressing the problem of a sinusoidal-type warp ("S-warp") which appears in glass ribbons as a result of across-the-ribbon temperature distributions which cause the edges of the ribbon to be under compression and thus buckle (warp), with the resulting pattern becoming frozen into the ribbon at the transformation zone.

In considering the sources of a non-flat shape, it should be noted that the shape of the ribbon in the transformation zone tends to change over a sheet production cycle, i.e., between the cutting of one sheet from the ribbon and the cutting of the next sheet. These shape changes result from a variety of sources, including the actual cutting of the sheet which tends to produce buckling and/or vibrations which travel through the elastic ribbon into the transformation zone. Other factors that can induce shape changes in the elastic zone which change with time during a sheet production cycle include: (1) the varying tension in the ribbon resulting from the varying length and thus varying suspended weight of the ribbon as it grows in length to produce a full sheet and (2) thermal gradients which interact with the growing ribbon and thus produce time-varying changes in the shape of the ribbon, including the shape in the transformation zone.

Whatever its source, a non-flat shape in the transformation zone in combination with a substantially flat across-the-ribbon temperature distribution in that zone means that a substrate cut from the ribbon will have a non-flat shape at room temperature. To a first approximation, that shape will resemble the across-the-ribbon shape in the transformation zone, although in practice, due to the complexities of the glass manufacturing process, including the cooling of the ribbon which occurs throughout the length of the transformation zone, the room temperature shape will differ from that in the transformation zone. If the room temperature shape is not a developable shape, the substrate will exhibit in-plane shape changes when flattened. Similarly, sub-pieces cut from the substrate will, in general, exhibit distortion.

As in Case 1, the above considerations also apply to the more general case of a temperature distribution that produces a uniform across-the-ribbon thermal strain gradient, the flat temperature distribution, as discussed above, being just one specific example of the general case.

In the next more complex case (Case 3), the ribbon has a substantially flat across-the-ribbon shape in the transformation zone while the across-the-ribbon temperature distribution is non-flat and also is not a temperature distribution that produces a uniform across-the-ribbon thermal strain gradient. In this case, as the ribbon cools, stresses and thus strains will develop in the ribbon which, since the ribbon is thin, will result in buckling. Thus, at room temperature, a substrate cut from the ribbon will not have the substantially flat across-the-ribbon shape which existed in the transformation zone, but will have a non-flat shape. That non-flat shape can be expected to be a non-developable shape. Accordingly, when the substrate is flattened, it will exhibit in-plane stresses and the resulting strains which will manifest themselves as in-plane shape changes. Likewise, sub-pieces cut from the substrate will, in general, exhibit distortion.

Similarly, in the final, most complex case (Case 4), where the ribbon has both a non-flat across-the-ribbon shape and an across-the-ribbon temperature distribution that is non-flat and also is not a temperature distribution that produces a uniform across-the-ribbon thermal strain gradient, at room temperature, a substrate cut from the ribbon will, in general, have a non-flat shape and thus, when flattened, will exhibit in-plane stress and the resulting strain and in-plane shape change. Again, sub-pieces cut from the substrate will, in general, exhibit distortion. The non-flat shape at room temperature will be different from the non-flat shape at the transformation zone due to the thermal stresses generated in the glass as the across-the-ribbon temperature distribution in the transformation zone becomes the flat temperature distribution at room temperature. That is, different across-the-ribbon locations will shrink more or less than neighboring locations, thus producing stresses, which will lead to buckling which will change the shape of the glass from that which existed in the transformation zone.

To summarize, the manufacturing process for producing glass substrates can be viewed as progressing from one state that is substantially free of long range, stress (that of the transformation zone) to another state that is substantially free of long range, stress (that of the substrate or sub-piece at room temperature), with the substantially long range, stress-free state at room temperature being a consequence of the thinness of the glass which allows long range stress to be relieved by buckling. Such buckling, however, means that when flattened, the substrate will develop in-plane stress and therefore exhibit strain and thus in-plane shape changes when flattened. Similarly, sub-pieces cut from the substrate will, in general, exhibit undesirable distortion.

The preceding discussions of sections V(A), V(B), and V(C) of this specification set forth what is currently believed to be at least some of the mechanisms involved in producing distortion in sub-pieces cut from a substrate. However, because of the complexity of the glass manufacturing process, some or all of these mechanisms may not be operable in a particular manufacturing process, and other mechanisms may play significant roles. The above discussions, however, are believed to facilitate the understanding of the distortion problem, as well as the role the present invention plays in addressing this problem. By presenting these discussions, applicants do not intend to be bound by any particular theory of operation of the present invention. In particular, the claims appended hereto are not to be so limited.

(D) Combinations of Across-the-Ribbon Temperature Distribution(s) and Across-the-Ribbon Shape(s) that Control Distortion As discussed above, in accordance with certain of its aspects, the present invention relates to continuous glass manufacturing processes in which (1) a glass ribbon is produced and (2) an across-the-ribbon temperature distribution is matched with an across-the-ribbon shape in a region of the ribbon where the glass is passing through its setting zone temperature range (SZTR) so as to produce glass sheets (glass substrates) which exhibit controlled levels of distortion when cut into sub-pieces. Specifically, the across-the-ribbon temperature distribution and the across-the-ribbon shape are matched so that flattening of the sub-pieces produces distortion levels that are preferably less than 2 microns.

(1) Distortion and Surrogates for Distortion

Whether a sub-piece of a glass sheet exhibits a low level of distortion can be determined directly by, for example, examining the shape of the sub-piece under vacuumed flat conditions. In many cases, however, it will be more convenient to use one or more surrogates for distortion.

For example, the three-dimensional shape of a glass sheet or sub-piece in a gravity-free or substantially gravity-free environment can be used as a surrogate for distortion. Such a three-dimensional shape can, for example, be determined using the procedures of commonly-assigned U.S. patent application Ser. No. 11/192,381, entitled "Process and Apparatus for Measuring the Shape of an Article", which was filed on Jul. 27, 2005 in the names of B. Strines, N. Venkataraman, D. Goforth, M. Murtagh, and J. Lapp, the contents of which in their entirety are hereby incorporated herein by reference. Alternatively, the three-dimensional shape of the sheet or sub-piece under gravity conditions, e.g., when placed on a flat surface but not vacuumed onto the surface, can be used as a surrogate for distortion, although in many cases, due to the thinness of the glass sheet, the three-dimensional shape under gravity conditions may be essentially flat and thus difficult to measure accurately.

In general terms, the greater the deviation of such measured three-dimensional shapes from a plane, the greater will be the level of distortion exhibited by sub-pieces, cut from a substrate. Rather than comparing a sheet's three-dimensional shape to a plane, changes in the sheet's shape upon vacuum flattening can be used as a surrogate for distortion, i.e., in-plane shape changes can be used as a surrogate for distortion. If desired, calculations can be made of predicted levels of distortion from a three-dimensional shape determination under either gravity or non-gravity conditions or from in-plane shape changes, although such calculations are not, in general, needed in the practice of the invention.

Stress measurements at one or more locations on the glass sheet or sub-piece, e.g., stress measurements made using a birefringence technique, can also be used as a surrogate for distortion. Such measurements will typically be made while the sheet or sub-piece is being vacuumed against a flat surface, although the measurements can also be made in the absence of vacuum. Measurements can be made at locations distributed over the entire two-dimensional surface of the sheet or sub-piece, or at just a limited number of locations, e.g., along one or more of the sheet's or sub-piece's edges, and/or at predetermined reference locations. Stress measurements along, or in the vicinity of, the cut lines that will be used to divide a sheet into sub-pieces may often be an effective surrogate for the distortion which sub-pieces will exhibit. When measurements are made at a plurality of locations on a sheet or sub-piece, it may in some cases be useful to filter the data to remove components with high spatial frequencies, which are less likely to be relevant as a surrogate for distortion (see the discussion of spatial frequencies in Section V(B) above). As with shape measurements, if desired, calculations can be made of predicted levels of distortion from stress measurements, although again, such calculations are not needed to practice the invention.

As a general guideline, a glass sheet will exhibit a low level of distortion when cut into sub-pieces (i.e., a maximum distortion of 2 microns for the sub-pieces) if the magnitude of the maximum edge stress level exhibited by the sheet when vacuumed onto a flat plane is less than or equal to 125 pounds per square inch (psi) (preferably, less than or equal to 100 pounds per square inch, most preferably, less than or equal to 50 pounds per square inch) for a sheet having an area greater than or equal to 0.25 square meters. In general, as sheet size increases, the magnitude of the maximum edge stress level needs to decrease to achieve the same level of distortion.

(2) Drawing Processes for Producing Glass Sheets

FIG. 1 illustrates a representative application of the invention to a glass drawing process of the fusion downdraw type. As shown in this figure, a typical fusion apparatus includes a forming structure (isopipe) 37, which receives molten glass (not shown) in a cavity 39. The root of the isopipe is shown at 41, and the ribbon of glass 15, after leaving the root, traverses edge rollers 27a, 27b. The root 41 of the isopipe 37 refers to the position where molten glass from both outer sides of isopipe 37 join together.

After passing the edge rollers 27a, 27b, the glass ribbon is engaged by pulling rolls 29 which draw the ribbon away from the isopipe. After sufficient cooling, individual glass sheets 13 are separated from the ribbon using, for example, a scoring wheel and a traveling anvil (not shown) to form a score line 35 across the width of the ribbon.

As fusion apparatus is known in the art, details are omitted so as to not obscure the description of the example embodiments. It is noted, however, that other types of glass fabrication apparatus (e.g., float apparatus) may be used in conjunction with the invention. Such apparatus is within the purview of the artisan of ordinary skill in glass manufacture.

In a fusion or other type of glass manufacturing apparatus, as glass ribbon 15 travels through the apparatus, the glass experiences intricate structural changes, not only in physical dimensions but also on a molecular level. The change from a supple approximately 50 millimeter thick liquid form at, for example, the root of an isopipe to a stiff glass sheet of approximately a half millimeter of thickness is achieved by controlled cooling of the ribbon as it moves through the machine.

Illustratively, the glass of the example embodiments is flat glass having a thickness on the order of approximately 0.1 to 2.0 mm. The glass may be used in glass displays such as those referenced above, or in other applications where thin glass sheets are beneficial. As representative examples, the glass may be Corning Incorporated's Code 1737 or Code Eagle 2000 glass, or glasses for display applications produced by other manufacturers.

(3) The SZTR

In terms of the present invention, the critical portion of the glass manufacturing process takes place in the glass' SZTR, shown schematically for the representative fusion process of FIG. 1 by the reference number 31. All drawing processes, including float processes, have a SZTR, but the spacing between the forming apparatus and the SZTR may be different from that shown schematically in FIG. 1. Likewise, fusion processes may have SZTR's at longitudinal positions different from that shown schematically in this figure.

The SZTR plays a critical role in distortion because of the behavior of the glass both within the SZTR and above and below the SZTR. At the higher temperatures which exist above the SZTR, glass behaves basically like a liquid: its response to an applied stress is a strain rate, and any elastic response is essentially undetectable. At the lower temperatures which exist below the SZTR, it behaves like a solid: its response to a stress is a finite strain, and any viscous response is essentially undetectable.

When glass cools from a high temperature and passes through the SZTR, it does not show an abrupt transition from liquid-like to solid-like behavior. Instead, the viscosity of the glass gradually increases, and goes through a visco-elastic regime where both the viscous response and the elastic response are noticeable, and eventually it behaves like a solid. As a result, there is no single freezing temperature to use in thermal stress/strain/distortion calculations. However, the use of a temperature range as a basis for controlling distortion, as opposed to a single setting temperature, turns out to have a number of advantages. Thus, for any single temperature in the SZTR, there will, in general, be a measurable elastic response above the temperature and a measurable viscous response below it. Thus, employing a single setting temperature could produce inaccurate results: for example, if the cooling schedule applied to the ribbon involves a sufficiently long hold time below such a single setting temperature but within the visco-elastic regime, calculations using the single setting temperature value and/or distortion control based on such a single temperature could be inaccurate. In addition, having a range of temperatures which can be used to control distortion allows greater flexibility in the glass manufacturing process, e.g., in the placement of heating and/or cooling equipment to achieve a desired across-the-ribbon temperature distribution. In accordance with the invention, it has been found that the SZTR for any particular glass composition can be determined from a knowledge of the glass' viscosity as a function of temperature, along with knowledge of (1) the glass drawing rate, (2) the glass cooling rate or, more particularly, an approximation thereto based on the drawing rate, and (3) the glass' Young's modulus at room temperature.

Figure 18:
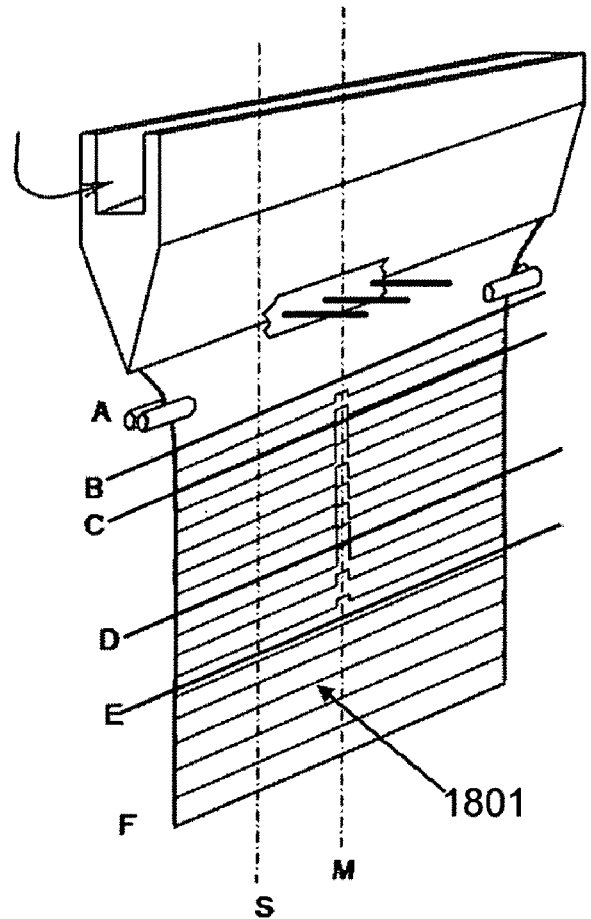
FIG. 18 is a schematic drawing illustrating the temperature distribution used in determining the upper and lower limits of the SZTR.

FIG. 18 shows the model system employed in the analysis used to determine the SZTR. In particular, this figure shows a glass ribbon below the root of an isopipe. In this figure, 1801 are isotherms. In the analysis, only the part of the ribbon that is close to the ribbon's final thickness is considered, i.e., the small region below the root where most of the thickness attenuation occurs is not included in the analysis. The ribbon is assumed to be flat and to cool at a uniform rate. Because the portion of the ribbon being analyzed has a substantially uniform thickness, a uniform cooling rate in time implies a uniform cooling rate with respect to distance below the root. Sheets of glass (substrates) are assumed to be cut off of the bottom of the ribbon periodically, as the ribbon grows during the drawing process, and the goal of the analysis is to determine the residual stress in such sheets as a result of an across-the-ribbon temperature distribution.

Under the above assumptions, if there were no across-the-ribbon temperature variations anywhere in the ribbon, the resulting sheets of glass would have no residual stress. To determine the location of the SZTR, a small across-the-ribbon temperature variation $\Delta T$ is introduced in a width-wise narrow zone (that is, a zone that is narrow in the across-the-ribbon direction). In FIG. 18, this zone is depicted using isothermal contours. The zone has an extent in the draw-wise direction (that is, in the direction parallel to the main glass flow). In accordance with the analysis, this draw-wise extent is varied and the resulting changes in residual stress are used to determine the SZTR. In particular, by varying the draw-wise extent, the zone outside of which an across-the-ribbon $\Delta T$ has only a weak effect is determined. The SZTR is then the complement to this zone, i.e., the SZTR is the region where an across-the-ribbon $\Delta T$ has a substantial effect (i.e., at least a 10% effect) on the residual stress in the glass sheets.

Figure 19:
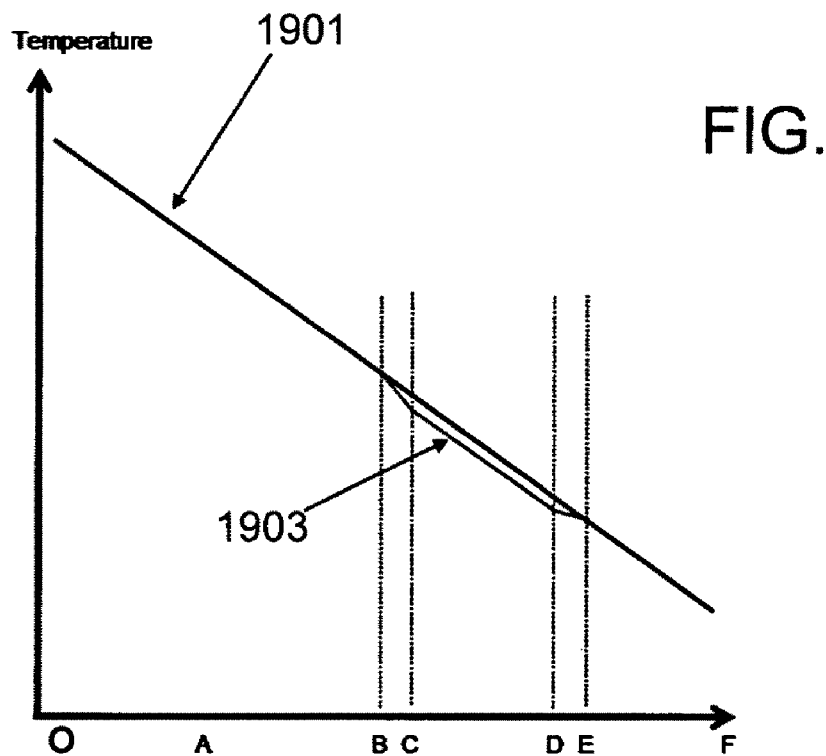
FIG. 19 is drawing showing temperature as a function of distance from the root of an isopipe for lines S and M in FIG. 18.

FIG. 19 shows the temperature in the ribbon as a function of distance below the root. In this figure, "O" means root. Along line S of FIG. 18, the temperature distribution corresponds to a uniform cooling rate (1901 in FIG. 19). Along line M of FIG. 18, which passes through the region in which the across-the-ribbon $\Delta T$ is imposed, the temperatures (shown as 1903 in FIG. 19) differ from those along line S. The difference is restricted to a zone between B and E shown in FIG. 18. The difference starts at B, increases to $\Delta T$ (the imposed across-the-ribbon $\Delta T$) at C, stays constant from C to D, and then drops until it vanishes at E. The distance between B and C, and that between D and E, has to be non-zero, since the across-the-ribbon $\Delta T$ has to build up from zero to its full value (or vice-versa) over a non-zero time interval. The smaller the across-the-ribbon $\Delta T$, the smaller the distance between B and C, and that between D and E, can be. In determining the SZTR, we only need to consider across-the-ribbon $\Delta T$'s of small amplitude, so B and C are very close to each other, as are D and E. (Here, "very close" is a distance that is small in comparison to the distance between C and D.) Thus, the hotter boundary of the region in which the across-the-ribbon $\Delta T$ is applied can be represented by just B or C, e.g., by C. Likewise, D or E (e.g., D) can be used to represent the cooler boundary of the region.

In the discussion that follows, the term "$\Delta T$-affected zone" will be used to refer to the portion of the ribbon on which the across-the-ribbon $\Delta T$ is imposed. As shown in FIG. 18, subject to the above assumptions, this zone is between C and D in the draw-wise direction, and has a small extent about line M in the width-wise direction. Also, the temperature and viscosity at point C in FIG. 18 will be referred to as $T_H$ and $\eta_H$, respectively, while those at D will be referred to as $T_L$ and $\eta_L$, respectively. The coefficient of thermal expansion (CTE) and Young's modulus (E) of the glass are taken to be constant (independent of temperature) in this analysis. An examination of the effects of using a CTE and/or a Young's modulus which varies with temperature has shown that such variations can be expected to change the setting zone temperature range by less than 5% (data not shown). Since the overall accuracy of the model is of the same order of magnitude, i.e., the model provides SZTR values which are considered accurate to approximately ±5%, the above assumptions are considered to be well justified, especially since they allow the SZTR to be readily calculated using a conventional fit to viscosity versus temperature data, i.e., a Fulcher fit (see below).

The net strain (that is, thermal strain+elastic strain+viscous strain) in the $\Delta T$-affected zone and the rest of the ribbon have to match at any particular vertical location. For ease of reference, the term "mechanical strain" is used to refer to elastic strain+viscous strain. For the net strain to match, mechanical strain will have to occur, since there is a thermal strain mismatch between the $\Delta T$-affected region and the rest. There will be mechanical strain in the $\Delta T$-affected region, as well as in the rest of the ribbon. However, since the $\Delta T$-affected zone is small in the width-wise direction, the mechanical strain in the rest of the ribbon will be very small, and almost all of the mechanical strain needed to make the net strains match will occur in the $\Delta T$-affected zone. The mechanical strain $\epsilon_M$ in the $\Delta T$-affected zone can therefore be written as (hereinafter referred to as Eq. A):

$$\varepsilon_M = \begin{cases} 0 \text{ in the non-}\Delta T\text{-affected zone between } A \text{ and } C \\ (\text{since we take } B \text{ and } C \text{ to be almost coincident}) \\ \Delta T * (\text{tangent } CTE) \text{ in the } \Delta T\text{-affected zone between } C \text{ and } D \\ 0 \text{ in the non-}\Delta T\text{-affected zone between } D \text{ and } F \\ (\text{since we take } D \text{ and } E \text{ to be almost coincident}) \end{cases}$$

The stress corresponding to the mechanical strain $\epsilon_M$ must be calculated using a visco-elastic analysis (see, for example, Findley, W. N., Lai, J. S., Onaran, K., *Creep and Relaxation of Nonlinear Viscoelastic Materials*, Dover Publications, Inc., 1989; hereinafter referred to as "Findley et al."). The material model used in the present analysis was a Maxwell model (see Findley et al. at page 53). That is, under uniaxial tension, the mechanical strain rate ($\dot{\epsilon}$) is related to stress ($\sigma$), stress rate ($\dot{\sigma}$), viscosity ($\eta$), and Young's modulus (E) as:

$$\dot{\varepsilon} = \frac{\sigma}{3\eta} + \frac{\dot{\sigma}}{E} \tag{Eq. B}$$

This Maxwell model captures the main visco-elastic constitutive behaviors of interest. The behaviors it cannot account for, such as delayed elastic response, are of minor consequence for determining the SZTR.

As mentioned above, the constitutive behavior described by Eq. B is for uniaxial tension. Since the $\Delta T$-affected zone in the model system is narrow in the width-wise direction, one will not have uniaxial tension in the $\Delta T$-affected zone; rather, the strain in the width-wise direction would be constrained to be zero. Under that condition, the $3\eta$ term in Eq. B ought be replaced by $4\eta$. However, when doing stress compensation in an actual glass forming process, long-scale perturbations in the across-the-ribbon temperature will typically be applied, and in that case, strain in the horizontal direction will not be completely constrained. It is for this reason that $3\eta$ is used in Eq. B. In practice, it has been found that using $3\eta$ or $4\eta$ in Eq. B turns out not to be of particular consequence in identifying the SZTR in terms of temperature since a factor of $4/3$ constitutes a representative viscosity change over 5° C. in the setting zone. Thus, the uncertainty in the amount of constraint on width-wise strain can be expected to result in an uncertainty in the setting zone temperature range of only 5° C. This is within the overall accuracy of approximately ±5% of the SZTR determination (see above).

Using the foregoing equations A and B, residual stress can be calculated as follows. First, the mechanical strain of $\Delta T^*$ (tangent CTE) is taken to be suddenly imposed at C, as expressed in Eq. A. Thus, at C, the instantaneous response is completely elastic, and we have:

$$\sigma = E \cdot \Delta T \cdot (\text{tangent} CTE) \text{ at } C \quad \text{(Eq. C)}$$

From C to D, the strain rate is zero for the model system, since mechanical strain is constant per Eq. A. Thus, Eq. B is an ordinary differential equation (ODE) from C to D relating the stress rate to stress, since the strain rate is known (zero). The initial condition is equation Eq. C. This ODE can be solved using standard techniques (see, for example, Findley et al. for the solution for the constant viscosity case). In the present system, viscosity is a function of temperature (and of time, given a specified cooling rate), so the ODE was solved in several time steps, using a piece-wise constant value for the viscosity within each time step. Carrying this solution out up to D gave the value of stress at D (hereinafter referred to as $\sigma_{D-}$).

At D, as at C, according to Eq. A, a sudden mechanical strain of $-\Delta T^*$(tangent CTE) is applied. Thus, at D, the instantaneous response is:

$$\sigma = \sigma_{D-} - E \cdot \Delta T \cdot (\text{tangent} CTE) \text{ at } D \quad \text{(Eq. D)}$$

From D to F, the strain rate is again zero, so we use Eq. D as the initial condition, and solve Eq. B to obtain the stress at F. This final stress at F is the change in residual stress $\Delta \sigma_R$ due to the imposed temperature perturbation $\Delta T$.

If C, D are specified in terms of the temperatures at those locations, the velocity of the ribbon down the draw (the "drawing rate") does not explicitly enter the calculations; only the cooling rate does. However, the velocity of the ribbon down the draw and the cooling rate are related. Thus, if one starts with the velocity ($V_D$) of the ribbon down the draw (or, more generally, along the draw in the case of an updraw process or a horizontal process, such as a float process) and knows the distance (L) along the draw between the glass' softening point ($T_{SP}$) and its annealing point ($T_{AP}$), then a cooling rate (CR) can be determined from the following equation:

$$CR = (T_{SP} - T_{AP}) * V_D / L$$

where, as is conventional, $T_{SP}$ is the temperature at which the glass has a viscosity of $10^{6.65}$ Pa·s and $T_{AP}$ is the temperature at which the glass has a viscosity of $10^{12}$ Pa·s. Although other temperatures besides the softening point and the annealing point can be used to determine a cooling rate from a drawing rate, for purposes of the present invention, these are the temperatures that are preferred and are used in the practice of the invention.

The maximum possible change in residual stress for a given across-the-ribbon $\Delta T$ will occur if C is at a very high location (say, above the softening point) and D is at a very low location (say, well below the strain point, at the bottom of the ribbon). For the case of constant CTE and E consider here, the maximum possible change in residual stress caused by $\Delta T$ is:

$$\Delta \sigma_{MAX} = CTE \cdot E \cdot \Delta T \quad \text{(Eq. E)}$$

As will now be shown, using $\Delta \sigma_{MAX}$ of Eq. E and the following scaling parameter, the SZTR for a glass can be determined based on knowledge of the glass' viscosity $\eta$ as a function of temperature:

$$\frac{\eta \cdot \text{Cooling Rate} \cdot °C.^{-1}}{E} \quad \text{(Eq. F)}$$

This parameter is related to the relaxation modulus discussed at, for example, pages 81-82 of Findley et al. It will be referred to hereinafter as the "setting zone parameter" or simply the "SZP".

Figure 20:
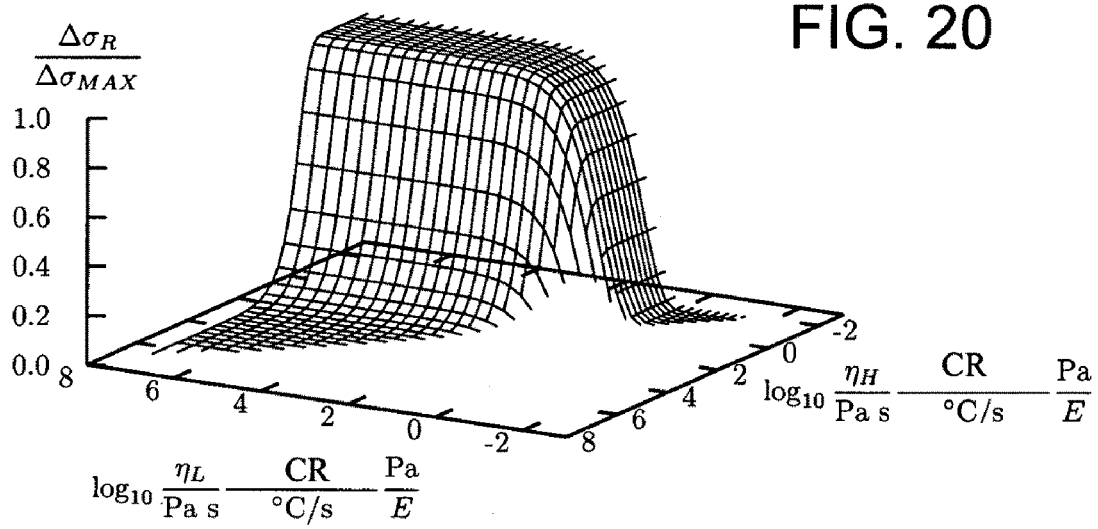
FIG. 20 is a plot showing residual stress as a function of the extent of the ΔT-affected zone.

FIG. 20 shows the change in residual stress $\Delta \sigma_R$, scaled by the maximum possible value $\Delta \sigma_{MAX}$ of Eq. E, as a function of the SZP evaluated at $\eta_H$ and $\eta_H$, where $\eta_H$ and $\eta_L$ are the viscosities at C and D, respectively, in FIG. 18. Note that as long as the CTE is constant, the change in residual stress scaled by the maximum possible change in residual stress is independent of CTE. In all FIGS. 20, 21 and 22, "CR" represents cooling rate.

FIG. 20 shows the following:

(1) If the SZP evaluated at $\eta_H$ is very low (corresponding to a very high $T_H$), and the SZP evaluated at $\eta_L$ is very high (corresponding to a very low $T_L$), $\Delta \sigma_R$ has the maximum possible value, so the applied across-the-ribbon $\Delta T$ has the maximum possible effect.

(2) There is a sizable plateau over which $\Delta \sigma_R$ has its maximum possible value. That is, if the SZP evaluated at $\eta_H$ is very low and the SZP evaluated at $\eta_L$ is very high, we have some room for increasing the SZP evaluated at $\eta_H$ and reducing the SZP evaluated at $\eta_L$ (i.e., we have some room for decreasing $T_H$ and increasing $T_L$) without having any detrimental effect on the effectiveness of the imposed $\Delta T$ in causing a change in residual stress. This is the essence of the setting zone concept: it is not necessary to impose the across-the-ribbon $\Delta T$ over the entire ribbon in order to cause a desired change in the residual stress. Rather, it is sufficient to apply it over a smaller zone as long as that zone is chosen properly.

(3) The most effective choice of the SZP evaluated at $\eta_H$ and the SZP evaluated at $\eta_L$ is near the corner of the plateau that is closest to the foreground, since that corner is closest to the SZP($\eta_H$)=SZP($\eta_L$) line, and hence gives the smallest zone in which the across-the-ribbon $\Delta T$ is to be imposed.

To quantify the SZTR, it is convenient to look at the rectangular, flat-topped hill of FIG. 20 from its two sides, that is, along directions parallel to the $\eta_L$ and $\eta_H$ axes of the SZP. FIGS. 21 and 22, which are views along these directions, show the following:

(1) From FIG. 21, if the SZP evaluated at $\eta_L$ is less than 2.7, the change in residual stress is less than 10% of its maximum possible value, regardless of the value of the SZP evaluated at $\eta_H$. If the SZP evaluated at $\eta_L$ is less than 3.9, the change in residual stress is less than 20% of its maximum possible value, again regardless of the value of the SZP evaluated at $\eta_H$.

(2) From FIG. 22, if the SZP evaluated at $\eta_H$ is greater than 55.8, the change in residual stress is less than 10% of its maximum possible value, regardless of the value of the SZP evaluated at $\eta_L$. If the SZP evaluated at $\eta_H$ is greater than 24.5, the change in residual stress is less than 20% of its maximum possible value, again regardless of the value of the SZP evaluated at $\eta_L$.

(3) Accordingly, an across-the-ribbon $\Delta T$ applied at a location where the nominal ribbon temperature (e.g., the temperature of the glass as measured along its centerline) corresponds to a SZP value outside of the range of 2.7 to 55.8 cannot have an effectiveness of more than 10%. This is because if the across-the-ribbon $\Delta T$ is applied at a location where the SZP is outside of the 2.7 to 55.8 range, then either the SZP evaluated at $\eta_L$ is less than 2.7 or the SZP evaluated at $T\eta_H$ is greater than 55.8. In either case, as shown in FIGS. 21 and 22, the effectiveness is less than 10%.

(4) By the same argument, an across-the-ribbon ΔT applied at a location where the nominal ribbon temperature corresponds to a SZP value outside of the range of 3.9 to 24.5 cannot have an effectiveness of more than 20%.

In view of the foregoing, as used herein, the phrase "setting zone temperature range" and the abbreviation "SZTR" refer to the temperature range for a particular glass and draw rate which corresponds to the ≦10% effectiveness range described above. Specifically, the SZTR is the range of temperatures which corresponds to viscosities which give SZP values that satisfy the relationship: $2.7 \leq SZP \leq 55.8$. This SZP range corresponds to a temperature range of approximately 60° C. for Corning Incorporated Code 1737 and Eagle 2000 LCD glasses.

Likewise, the phrase "central setting zone temperature range" and the abbreviation "cSZTR" refer to the temperature range for a particular glass and draw rate which corresponds to the ≧20% effectiveness range described above (i.e., the cSZTR is the range of temperatures which corresponds to viscosities which give SZP values that satisfy the relationship: $3.8 \leq SZP \leq 24.5$). In terms of temperatures, this SZP range corresponds to a temperature range of approximately 40° C. for Corning Incorporated Code 1737 and Eagle 2000 LCD glasses.

Additionally, the phrase "sweet spot temperature range" and the abbreviation "ssSZTR" is used herein to refer to the temperature range for a particular glass and draw rate which corresponds to ≧40% effectiveness. Using the same analysis as described above for the SZTR and the cSZTR, the ssSZTR is the range of temperatures which corresponds to viscosities which give SZP values that satisfy the relationship: $6.9 \leq SZP \leq 11.8$. This SZP range corresponds to a temperature range of approximately 10° C. for Corning Incorporated Code 1737 and Eagle 2000 LCD glasses. Finally, the phrase "most sensitive setting zone temperature range" and the abbreviation "msSZTR" refer to the temperature range for a particular glass and draw rate for which the residual stress as determined above is most sensitive to an across-the-ribbon ΔT. The msSZTR corresponds to SZP values that satisfy the relationship: $8.3 \leq SZP \leq 8.9$. This SZP range corresponds to a temperature range of 5° C. or less for Corning Incorporated Code 1737 and Eagle 2000 LCD glasses.

The Young's modulus value used in determining the SZTR, cSZTR, ssSZTR, and msSZTR is the glass' room temperature Young's modulus determined using ASTM C623-92 (2000), while the viscosity versus temperature expression is that obtained by measuring the glass' viscosity using ASTM C1350M-96 (2003) at a set of temperatures and then fitting the resulting values to the following expression (the Fulcher equation) to obtain values for A, B, and $T_0$:

$$\ln(\text{viscosity/poise}) = A + B/(T/\text{Celsius} - T_0), \quad \text{Eq. G}$$

where $T_0$ is in Celsius.

The set of temperatures used for the Fulcher fit preferably includes temperatures within the SZTR. In practice, a trial SZTR can be determined using a Fulcher fit based on a first set of temperatures and, if needed, additional viscosity measurements can be made at additional temperatures and then used to determined a revised set of Fulcher coefficients, from which a final SZTR can be calculated. If necessary, this process can be repeated as needed to obtain a Fulcher fit appropriate for the temperature range of the SZTR.

As discussed above, the cooling rate (CR) used in determining the SZTR, cSZTR, ssSZTR, and msSZTR is obtained from the velocity of the ribbon down the draw (the drawing rate) and the distance along the draw between the glass' softening point and its annealing point.

(4) Determining Across-the-Ribbon Shapes

In accordance with certain embodiments of the invention, an across-the-ribbon shape is determined at one or more longitudinal positions in the SZTR and then an across-the-ribbon temperature distribution is applied to the ribbon at those one or more longitudinal positions (or at other longitudinal positions along the length of the ribbon) to control the distortion upon cutting into sub-pieces exhibited by glass sheets obtained from the ribbon.

The across-the-ribbon shape at the one or more longitudinal positions can be determined directly by observing the ribbon's shape as it is being drawn. Alternatively, across-the-ribbon shapes at the one or more longitudinal positions can be determined using stress and/or shape measurements made on one or more glass sheets obtained from the glass ribbon, in combination with a computer modeling program which can work "backwards" from such measurements to a determination of the across-the-ribbon shape(s) at the one or more longitudinal positions. As another alternative, a series of across-the-ribbon shapes can be assumed, a stress distribution and/or a shape for a glass sheet cut from the ribbon can be predicted for each of the assumed across-the-ribbon shapes. (the "forward" calculations), and then a specific across-the-ribbon shape can be selected from the series (i.e., determined) based on the across-the-ribbon shape of the series which most closely predicts stress and/or shape measurements obtained for individual sheets. Combinations of these approaches can be used if desired. Appendix A sets forth representative equations which can be used in such computer modeling. As discussed therein, such equations can be solved using, for example, the commercially-available ANSYS software.

Examples of the types of measurements that can be made on glass sheets to produce data for the "backwards" and/or "forward" calculations include: the gravity free or substantially gravity-free shape of the sheet, the non-gravity free shape of the sheet (e.g., a measured shape on a flat table, although in many cases, most of the shape will be flattened out under the weight of the glass so that accurate shape determinations are likely to be difficult), vacuumed edge stress values, vacuumed stress values for locations distributed over the entire surface of the sheet, vacuumed stress values at expected cut lines and/or at locations on lines close to and parallel to expected cut-lines, e.g., a few millimeters (e.g., 5 millimeters) from a cut line, and/or distortion resulting from localized cuts, e.g., cuts along expected cut lines. "Expected cut lines" are, for example, those lines which a display manufacturer is expected to use in dividing sheets into sub-pieces. It should be noted that for relatively smooth measured data, e.g., data filtered to remove high spatial frequency components, the "backwards" and "forward" calculations are generally well-behaved, i.e., the calculated across-the-ribbon shape and/or the calculated stress distribution and/or shape for individual sheets are unique or substantially unique in that there is only a small family of possible solutions.

In accordance with the invention, "determining" the across-the-ribbon shape(s) at the one or more longitudinal positions in the SZTR is not limited to observing or modeling such shape(s) (hereinafter referred to as "passive determining"), but includes actively adjusting (controlling) such shape(s) (hereinafter referred to as "active determining"). For example, the apparatus and methods disclosed in the commonly-assigned patent applications referred to above in Section V(C) can be used to purposely affect the shape of the ribbon in the SZTR. "Determining" across-the-ribbon shape(s) at the one or more longitudinal positions in accordance with the present invention includes using these or other techniques now known or subsequently developed in the art to obtain across-the-ribbon shapes at one or more longitudinal positions in the SZTR. "Determining" also includes combinations of observing, modeling, and/or controlling the across-the-ribbon shape(s) at the one or more longitudinal positions in the SZTR.

An additional factor that can be considered in determining across-the-ribbon shape(s) (either active or passive) is the changes in the shape of the ribbon that take place between the cutting of successive glass sheets from a glass ribbon, including the changes in shape(s) at the one or more longitudinal positions in the SZTR. Such temporal changes in shape can be observed during the operation of the drawing process and/or can be calculated using computer modeling. The temporal changes can be used to select one or more across-the-ribbon temperature distributions at one or more longitudinal positions that are particularly well-suited to control the distortion of glass sheets cut from the ribbon. For example, the temporal changes in shape can be used to identify one or more shapes at one or more longitudinal positions along the ribbon that lead to particularly high levels of distortion and then one or more across-the-ribbon temperature distributions can be chosen to specifically address the thus identified offending shape(s).

(5) Matching Across-the-Ribbon Temperature Distribution(s) to Across-the-Ribbon Shape(s)

Once the across-the-ribbon shape(s) have been actively and/or passively determined at one or more longitudinal positions in the SZTR, an across-the-ribbon temperature distribution is purposely applied at least one longitudinal position, which is preferably in the SZTR, in order to produce glass sheets with controlled levels of distortion. In general terms, the types of temperature distributions which will typically be applied can be understood in terms of Cases 1 through 4 of Section V(C) above.

Thus, if the across-the-ribbon shape(s) at the longitudinal position(s) of interest is actively and/or passively determined to be substantially flat, then in accordance with Case 1 of Section V(C) above, the across-the-ribbon temperature distribution at that longitudinal position(s) (or at, for example, neighboring longitudinal positions) can, for example, be adjusted to produce a substantially uniform across-the-ribbon thermal strain gradient, e.g., in the case of a constant CTE, the temperature distribution can have a substantially uniform across-the-ribbon gradient, which, in the simplest case, can be a substantially flat across-the-ribbon temperature distribution.

In the next more complicated case—Case 2—the across-the-ribbon shape at the longitudinal position(s) is determined not to be substantially flat, and the question becomes whether an across-the-ribbon temperature distribution like that used in Case 1 can be used. That is, the question becomes whether a substantially flat temperature distribution can be used or, more generally, whether a temperature distribution that produces a substantially uniform across-the-ribbon thermal strain gradient can be used with a non-flat across-the-ribbon shape.

In general, for a non-flat across-the-ribbon shape, the Case 1 temperature distributions will not produce low distortion glass sheets, i.e., glass sheets whose sub-pieces exhibit low distortion. However, if the non-flat, across-the-ribbon shape is substantially a developable shape, e.g., a cylindrical shape, then it may be possible to use the Case 1 temperature distributions. Thus, if the across-the-ribbon shape at the longitudinal position(s) is determined (actively and/or passively) to be substantially a developable shape, then the across-the-ribbon temperature distribution can be adjusted to be flat, or more generally, to be a distribution which produces a substantially uniform across-the-ribbon thermal strain gradient.

In Case 3, the ribbon is determined to have a substantially flat across-the-ribbon shape at the one or more longitudinal position(s), and the question becomes whether an across-the-ribbon temperature distribution that is non-flat can be used, or, more generally, whether a temperature distribution that does not produce a uniform across-the-ribbon thermal strain gradient can be used. Again, the answer involves developable versus non-developable shapes, but in this case, the relevant shapes are those after cooling of the ribbon.

Thus, if the removal of the temperature distribution at the longitudinal position(s) through cooling to room temperature results in substantially a developable shape, then such a temperature distribution can be used. However, if the cooling results in substantially a non-developable shape, then such a distribution can be expected to produce unacceptably high levels of distortion and should not be used.

The final case—Case 4—is the most general case, where the across-the-ribbon shape at the longitudinal position(s) is determined to be non-flat and the question is whether an applied across-the-ribbon temperature distribution that is non-flat and also is not a temperature distribution that produces a uniform across-the-ribbon thermal strain gradient should be used. Assuming the non-flat shape is a non-developable shape (compare Case 2 above), such a distribution should be used and indeed, in general, will be needed. The particular across-the-ribbon temperature distributions that can be used can be determined in a number of ways. For example, modeling software, such as that discussed in Appendix A, can be used to determine a temperature distribution at one or more longitudinal position(s) that will produce thermal stresses upon cooling that will cancel or substantially cancel the non-flat shape at the longitudinal position(s). Alternatively, an iterative procedure can be used, with or without the use of modeling, to determine a thermal distribution which appropriately matches the non-flat shape.

As the above discussion of Cases 1 through 4 illustrate, in selecting across-the-ribbon temperature distributions for the one or more longitudinal positions, one needs to consider whether the shape at the longitudinal position(s) is a developable or non-developable shape, and also needs to consider whether the shape of the resulting glass sheet (glass substrate) is a developable or non-developable shape.

In terms of distortion, both glass sheets that are substantially flat and those whose shape is substantially a developable shape will, in general, produce sub-pieces which exhibit low levels of distortion. Between the two shapes, the substantially flat sheet will often be preferred. However, in some cases, it may be desirable to produce glass sheets with a developable shape.

For example, such a shape may facilitate active determination of the across-the-ribbon shape in the SZTR, e.g., it may be easier with particular manufacturing equipment to produce an across-the-ribbon shape in the SZTR that results in a developable shape in glass sheets produced from the ribbon than in a flat shape. Glass sheets which have a developable shape, rather than being flat, may also facilitate shipping of such sheets to display manufacturers and/or handling of the sheets by such manufacturers.

In selecting an across-the-ribbon temperature distribution to match an across-the-ribbon shape, it may in some cases be helpful to decompose the across-the-ribbon shape into components (hereinafter referred to as "shape components") and then use, at least as a starting point, an across-the-ribbon temperature distribution that is the sum of the temperature distributions that would be appropriate for the individual shape components. For example, the across-the-ribbon shape may be decomposable into a developable shape component and a non-developable shape component, in which case, if desired, a temperature distribution can be used which only compensates for the non-developable shape component.

More generally, if the across-the-ribbon shape is decomposed into multiple non-developable shape components (with or without a developable shape component), then temperature distributions which compensate for each of the shape components can be combined, e.g., with weighting, to produce an overall across-the-ribbon temperature distribution which is appropriate for the overall across-the-ribbon shape. If desired, a library (look up table) of combinations of across-the-ribbon shape components and compensating temperature distributions can be prepared and used in real time to compensate for observed changes in the across-the-ribbon shape(s) at the one or more longitudinal position(s). For example, an across-the-ribbon shape can be passively determined at various points in time (or continuously), decomposed into shape components, and then, using the library, an across-the-ribbon temperature distribution can be changed to compensate for any observed changes in the weighting of any previously observed shape components or the addition of any new shape components. The library (look up table) can be a general purpose library or one that is customized for a particular glass manufacturing line based on historical information regarding the effects of particular across-the-ribbon temperature distributions in compensating for particular across-the-ribbon shape components. Similar approaches can be used in cases where across-the-ribbon temperature distributions are selected based on measurements performed on glass sheets cut from the ribbon and/or on sub-pieces cut from those sheets.

As a representative example, an across-the-ribbon shape $F(x)$, e.g., the deviations of the shape from a plane, can be decomposed into its Fourier components, e.g., $F(x)$ can be written:

$$F(x) = \Sigma_{n=0 \, to \, \infty}(A_n \sin(n\pi x/w) + B_n \cos(n\pi x/w))$$

or in complex notation:

$$F(x) = \Sigma_{n=-\infty \, to \, +\infty}(C_n \exp(in\pi x/w)),$$

where $A_n$, $B_n$, and $C_n$ are Fourier coefficients, "w" is the across-the-ribbon width, and "i" is sqrt(−1). An across-the-ribbon temperature distribution can then be associated with at least the $A_n$'s and $B_n$'s (or $C_n$'s) corresponding to lower spatial frequencies. The $A_n$'s and $B_n$'s (or $C_n$'s) determined for any particular across-the-ribbon shape can then be used to select weighted across-the-ribbon temperature distributions which will compensate for the particular across-the-ribbon shape.

In the case of measurements performed on glass sheets cut from the ribbon and/or on sub-pieces cut from those sheets, a two dimensional deconvolution can be used. For example, the measurement $M(x,y)$ (e.g., stress, shape, etc.) can be decomposed into its two-dimensional Fourier components, e.g., $M(x,y)$ can be written:

$$M(x,y) = \Sigma_{n=0 \, to \, \infty} \Sigma_{m=0 \, to \, \infty}(A_{nm} \sin(n\pi x/w)\sin(m\pi y/h) + B_{nm}\cos(n\pi x/w)\sin(m\pi y/h) + C_{nm}\sin(n\pi x/w)\cos(m\pi y/h) + D_{nm}\cos(n\pi x/w)\cos(m\pi y/h))$$

or in complex notation:

$$M(x,y) = \Sigma_{n=-\infty \, to \, +\infty} \Sigma_{m=-\infty \, to \, +\infty}(E_{nm}\exp(i(n\pi x/w + m\pi y/h)))$$

where $A_{nm}$, $B_{nm}$, $C_{nm}$, $D_{nm}$, and $E_{nm}$ are Fourier coefficients, "w" is the width of the sheet or sub-piece, and "h" is the height of the sheet or sub-piece. Again, in this case, the coefficients determined for any particular measurement can be used to determine an appropriate across-the-ribbon temperature distribution that will result in a desired level of distortion control.

In addition to decomposing an across-the-ribbon shape into its shape components, across-the-ribbon shapes can also be filtered to remove higher spatial frequencies. As discussed above, the spatial frequencies that are important for distortion are generally those having a spatial period longer than about one-quarter the width of the glass sheet, e.g., 250 millimeters for a 1 meter wide sheet. Accordingly, to facilitate selection of across-the-ribbon temperature distribution(s), the across-the-ribbon shape data is preferably filtered to remove the less relevant spatial frequencies. If decomposition of a shape into shape components is to be performed, such spatial frequency filtering is preferably performed before the decomposition, although it can be performed afterwards if desired. Filtering can also be used in cases where across-the-ribbon temperature distributions are selected based on measurements performed on glass sheets cut from the ribbon and/or on sub-pieces cut from those sheets. Again, the filtering can be performed with or without decomposition of the measurement into components and, if decomposition is performed, the filtering preferably precedes the decomposition.

If desired, filtering and spatial decomposition can be performed simultaneously by, for example, performing a decomposition into one or more long range components (lower spatial frequency components) and one or more short range components (higher spatial frequency components). Example 3 below follows this approach.

In certain preferred embodiments, the invention can be practiced by an iterative process which comprises the following steps:

(a) producing at least one sheet of glass under a set of operating conditions that comprises target temperature values for at least one longitudinal position along the length of the ribbon where the glass is passing through the SZTR, said target temperature values being at locations that are distributed across the width of the ribbon (the "across-the-ribbon locations");

(b) measuring one or more of the following for the at least one sheet produced under said set of operating conditions:
  (i) stress values at a plurality of spatially-separated locations on the sheet and/or on one or more sub-pieces cut from the sheet while the sheet and/or the sub-pieces are vacuumed onto a plane surface (the "stress values"),
  (ii) deviation-from-a-flat-plane values of the sheet and/or of one or more sub-pieces cut from the sheet under gravity-free or substantially gravity-free conditions (the "gravity-free deviation-from-a-flat-plane values"),
  (iii) deviation-from-a-flat-plane values of the sheet and/or of one or more sub-pieces cut from the sheet under gravity conditions (the "gravity deviation-from-a-flat-plane values"), and
  (iv) in-plane shape change values for the sheet and/or distortion values for one or more sub-pieces cut from the sheet (the "shape change/distortion values");

(c) comparing the measured values of step (b) with one or more distortion criteria and/or one or more surrogate distortion criteria;

(d) determining revised target temperature values for across-the-ribbon locations at least one longitudinal position along the length of the ribbon where the glass is passing through the SZTR using:
  (i) the comparison with the one or more distortion criteria and/or the one or more surrogate distortion criteria, and (ii) a computer model that is capable of relating changes in an across-the-ribbon thermal distribution to changes in predicted stresses and/or strains in the glass ribbon and/or in a glass sheet cut from the ribbon (e.g., a computer model of the type discussed in Appendix A);

(e) producing at least one sheet of glass using the revised target temperature values determined in step (d);

(f) measuring one or more of the following for the at least one sheet produced in step (e): (i) stress values, (ii) gravity-free deviation-from-a-plane values, (iii) gravity deviation-from-a-plane values, and (iv) shape change/distortion values; and (g) comparing the measured values of step (f) with the one or more distortion criteria and/or the one or more surrogate distortion criteria, and, if necessary, repeating steps (d) through (f), one or more times, using the same at least one longitudinal position and/or at least one different longitudinal position along the length of the ribbon. Preferably, steps (d) through (f) are repeated until at least one longitudinal position and target temperature values for said position are determined which produce measured values which satisfy the one or more distortion criteria and/or the one or more surrogate distortion criteria.

If desired, target temperature values can be specified at a plurality of longitudinal positions in the SZTR. In such a case, in step (d), the revised target values can be for just one of the plurality of longitudinal positions or for more than one longitudinal position, e.g., target values for all of the longitudinal positions can be changed. Also, as the iteration proceeds, more or less longitudinal positions can be varied as needed. For example, certain longitudinal positions may be found important at the beginning of the iterative process, with other longitudinal positions being more important for fine tuning, once the general area of the target temperature values has been found. Similarly, for a given longitudinal position, certain across-the-ribbon target value locations may be changed earlier in the iteration process, with others being changed later, and some being held constant throughout the process. The positions/locations to change at any particular iteration can be readily determined by persons skilled in the art from the present disclosure in combination with the predicted stress/strain values obtained from the computer modeling of step (d).

The gravity-free deviation-from-a-flat-plane values can, for example, be measured by suspending a sheet in a fluid having a density substantially the same as that of the glass. See commonly-assigned U.S. patent application Ser. No. 11/192,381, entitled "Process and Apparatus for Measuring the Shape of an Article", referred to above. Distortion values can, for example, be measured by placing marks on a glass sheet under vacuum conditions before cutting and observing where the marks move after cutting, again under vacuum conditions.

In other preferred embodiments, the invention can be practiced by an iterative process which does not necessarily employ a computer model, although it can use such a model if desired. In these embodiments, the practice of the invention comprises:

(a) determining a setting zone temperature range (SZTR) for the glass for the drawing rate of the glass ribbon;

(b) producing at least one sheet of glass under a set of operating conditions that comprises target temperature values for at least one longitudinal position along the length of the ribbon where the glass is passing through the SZTR, said target temperature values being at locations that are distributed across the width of the ribbon (the "across-the-ribbon locations");

(c) measuring one or more of the following for the at least one sheet produced under said set of operating conditions:
(i) stress values at a plurality of spatially-separated locations on the sheet and/or on one or more sub-pieces cut from the sheet while the sheet and/or the sub-pieces are vacuumed onto a plane surface (the "stress values"),
(ii) deviation-from-a-flat-plane values of the sheet and/or of one or more sub-pieces cut from the sheet under gravity-free or substantially gravity-free conditions (the "gravity-free deviation-from-a-flat-plane values"),
(iii) deviation-from-a-flat-plane values of the sheet and/or of one or more sub-pieces cut from the sheet under gravity conditions (the "gravity deviation-from-a-flat-plane values"), and
(iv) in-plane shape change values for the sheet and/or distortion values for one or more sub-pieces cut from the sheet (the "shape change/distortion values");

(d) comparing the measured values of step (c) with one or more distortion criteria and/or one or more surrogate distortion criteria;

(e) determining revised target temperature values for across-the-ribbon locations at least one longitudinal position along the length of the ribbon where the glass is passing through the SZTR using the comparison with the one or more distortion criteria and/or the one or more surrogate distortion criteria;

(f) producing at least one sheet of glass using the revised target temperature values determined in step (e);

(g) measuring one or more of the following for the at least one sheet produced in step (f): (i) stress values, (ii) gravity-free deviation-from-a-plane values, (iii) gravity deviation-from-a-plane values, and (iv) shape change/distortion values; and (h) comparing the measured values of step (g) with the one or more distortion criteria and/or the one or more surrogate distortion criteria, and, if necessary, repeating steps (e) through (g), one or more times, using the same at least one longitudinal position and/or at least one different longitudinal position along the length of the ribbon. Preferably, steps (e) through (g) are repeated until at least one longitudinal position and target temperature values for said position are determined which produce measured values which satisfy the one or more distortion criteria and/or the one or more surrogate distortion criteria.

Combinations of the foregoing iterative approaches can be used if desired. As just one example, the computer modeling approach can be used during, for example, process investigations, process start-up, and/or process changes, and a non-computer modeling approach used during, for example, more steady state operation.

Across-the-ribbon temperature distributions can be achieved using various heating/cooling devices to enable heating/cooling at a rate that is slower/faster than that realized using unaided radiation of heat and convection. Heating/cooling devices within the purview of those skilled in the art of glass sheet manufacture may be used to realize the desired across-the-ribbon thermal profile.

In terms of heating, a plurality of heating elements can be distributed across the width of the ribbon and the amount of power supplied to individual elements can be varied to achieve a desired temperature distribution at the surface of the ribbon. In terms of cooling, water cooling tubes (cooling bayonets) can be used to remove heat by radiation from the hot glass onto the cold (water cooled) metal surface of the bayonet. The heat extraction for conventional bayonets is mostly uniform across the width of the ribbon.

Figure 2A:
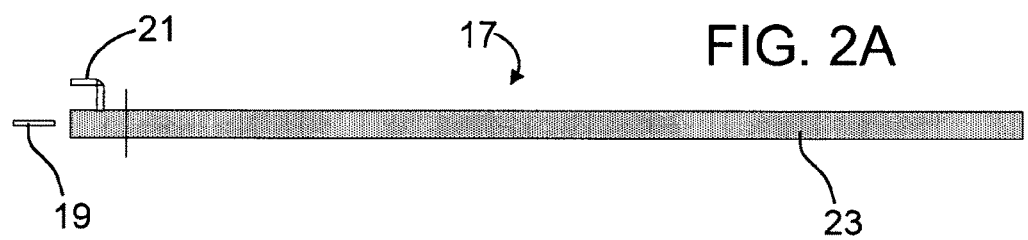

FIG. 2A shows a conventional cooling bayonet 17 in which water enters the bayonet through inlet 19, passes down the center of the bayonet, and then returns along its periphery where it absorbs heat before leaving through exit 21. In FIG. 2A, the bayonet is shown as having a uniform outside diameter and a uniform emissivity coating 23.

To achieve differential cooling, the surface of the bayonets can be coated with different emissivity coatings and/or the outside diameter of the bayonets can be increased or decreased along the length of the bayonet. Specifically, less cooling is achieved by reducing the outside diameter (reduction of heat transfer area) or reduction of surface emissivity (reduction in radiation absorbed by the surface) or a combination of outside diameter and emissivity. More cooling is achieved by the opposite conditions, i.e., larger diameters and higher emissivity.

Tubes of different diameter can be welded together to obtain the cross sectional area difference and coatings with different emissivity can be selected to obtain the desired radiation heat transfer control. If desired, the size, diameter, and emissivity of the higher and lower cooling regions can be adjusted so that their total heat extraction matches that of a standard cooling bayonet. In this way, the likelihood that across-the-ribbon cooling patterns selected to reduce distortion levels will have undesirable effects on other glass attributes can be minimized. Along these same lines, as a general proposition, producing an across-the-ribbon temperature distribution by localized temperature decreases is less likely to compromise overall glass quality than producing such a distribution by temperature increases.

As representative examples, FIG. 2B depicts a differential cooling bayonet which has two-emissivity coatings 23 and 25, and two diameters. With this design, it is possible to achieve 5 independent cooling regions. FIG. 2C shows a two-emissivity, three-diameter design which can achieve 7 independent cooling regions. In practice, more or less regions can, of course, be used as needed.

A further discussion of cooling bayonets that can be used in the practice of the present invention can be found in U.S. Patent Publication No. 2006/0081009, the contents of which in their entirety are incorporated herein by reference.

Without intending to limit it in any manner, the present invention will be more fully described by the following examples.

EXAMPLE 1

Temperature Distributions which Compensate for Spherically-Shaped Sheets

This example illustrates the principles of the invention for the case of a spherically-shaped sheet. In overview, the approach taken in this example, and in Example 2, is to model the stress generated upon vacuuming selected shapes onto a flat plane and then to use those calculated stress values to select a thermal distribution that produces a calculated thermal stress distribution that will at least partially cancel the vacuum generated stress distribution.

Figure 3:
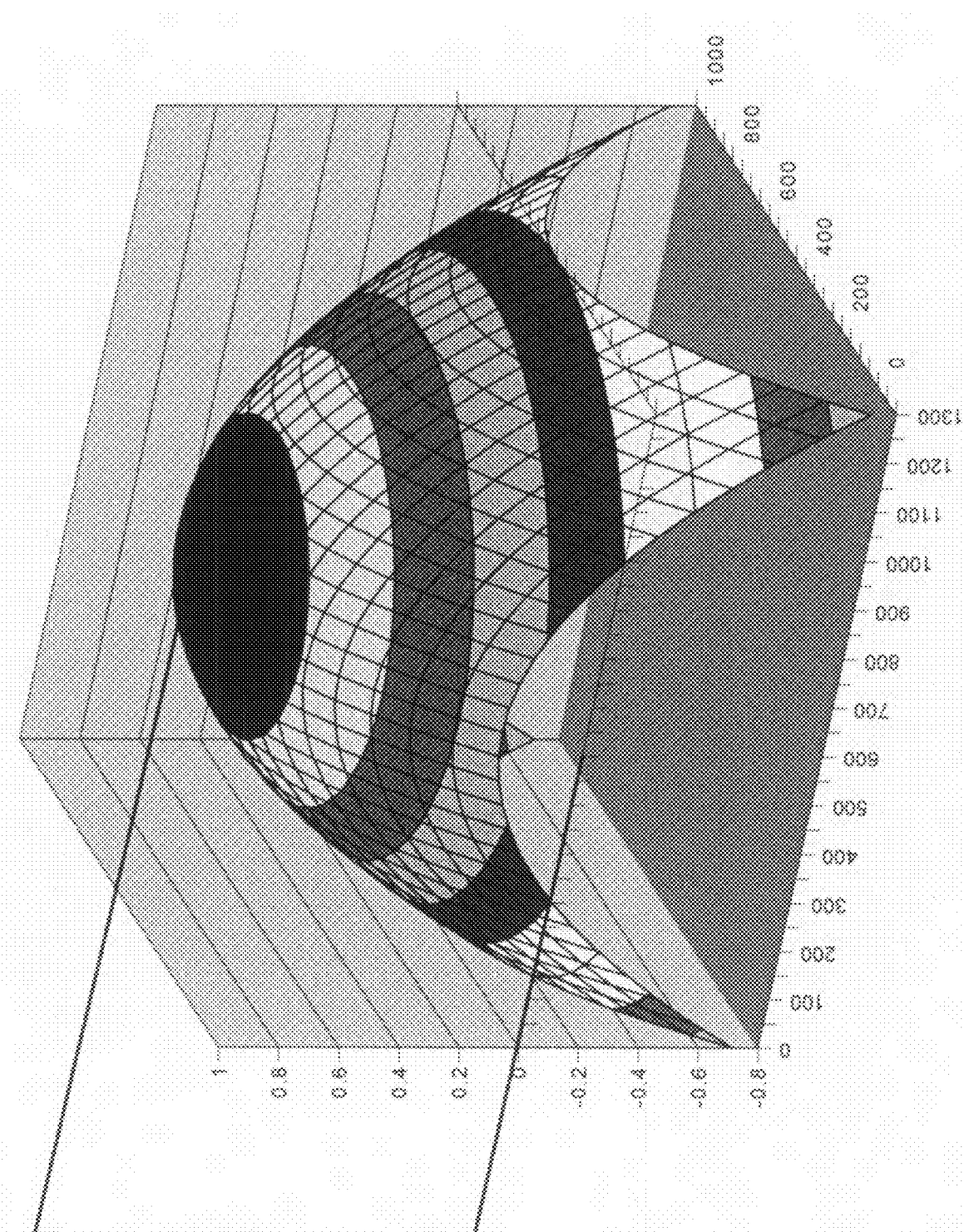
FIG. 3 is a drawing of a spherically-shaped glass sheet having a dome height of δ.

FIG. 3 shows a spherically-shaped, glass sheet having a width of 1100 millimeters, a length of 1300 millimeters, and a spherical dome height δ of 1 millimeter. FIG. 4 shows the resulting calculated edge stress levels along the width and length of the sheet (curves 43 and 45, respectively) when flattened onto a plane.

Figure 5:
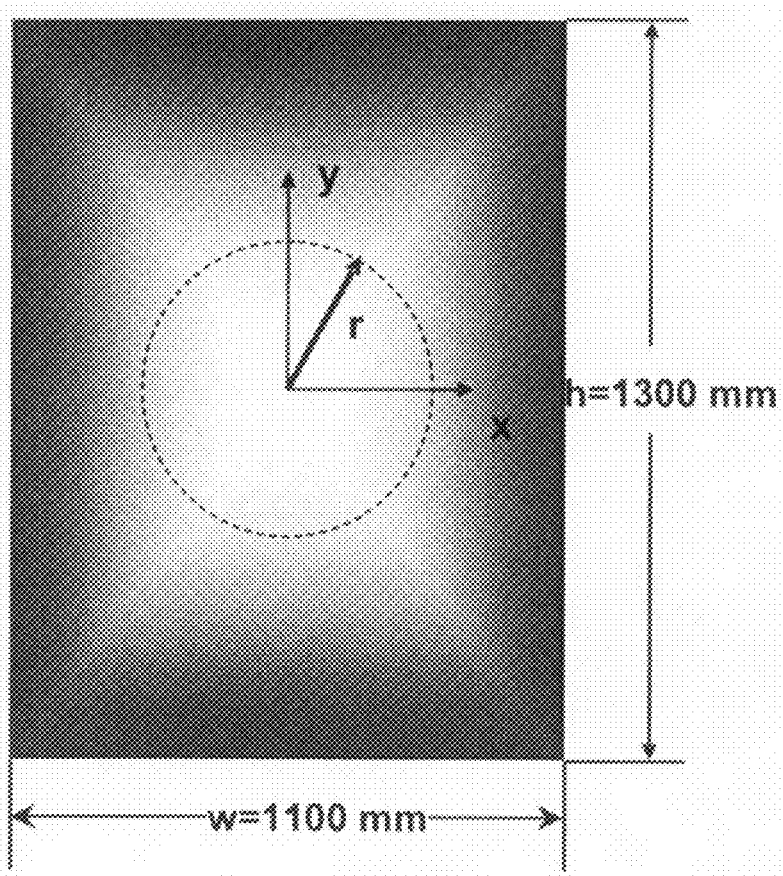
FIG. 5 is a drawing showing coordinate systems which can be used in calculating a thermal profile which will compensate for the edge stresses of FIG. 4.
Figure 6:
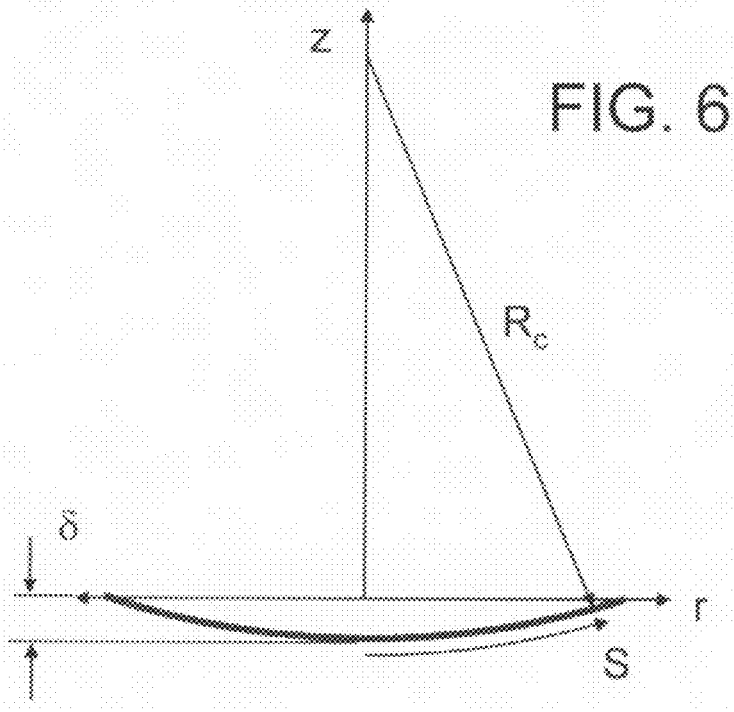
FIG. 6 is a drawing showing the geometry of the spherically-shaped sheet of FIG. 3.

FIGS. 5 and 6 show the geometry of the spherically-shaped sheet, as well as coordinate systems that can be used in determining a two-dimensional temperature distribution T(x, y) that will produce thermal strains which will precisely cancel the strains ε(r,θ) created when the curved sheet is flattened.

The strains ε(r,θ) produced upon flattening of the sheet are given by the difference between the perimeters after and before flattening as follows, where the subscript "f" refers to "after flattening" and the subscript "d" refers to "before flattening":

$$\varepsilon(r, \theta) = \frac{Perimeter_f - Perimeter_d}{Perimeter_f}. \quad (1)$$

In terms of the geometry of FIG. 6, Equation (1) can be transformed to:

$$\varepsilon(r, \theta) = \frac{2\pi S - 2\pi r}{2\pi S},$$

and then to:

$$\varepsilon(r, \theta) = 1 - \frac{r}{R_c \cdot \arcsin\left(\frac{r}{R_c}\right)},$$

where $$R_c = \frac{\left(\frac{h}{2}\right)^2 + \delta^2}{2\delta} = \text{radius of a curvature.}$$

The temperature distribution T(r,θ) that will cancel this strain distribution is given by the following equation, where CTE is the coefficient of thermal expansion of the glass, which in general is a function of temperature but is assumed to be a constant for the purposes of this example, and $T_{ref}$ is the reference temperature used in defining CTE:

$$\varepsilon(r, \theta) = 1 - \frac{r}{R_c \cdot \arcsin\left(\frac{r}{R_c}\right)} = -CTE \cdot (T(r, \theta) - T_{ref}). \quad (2)$$

Using FIG. 5, Equation (2) can be transformed to an (x,y) coordinate system to give T(x,y) as follows:

$$T(x, y) = T_{ref} - \left(\frac{1}{CTE}\right)\left(1 - \frac{\sqrt{x^2 + y^2}}{R_c \cdot \arcsin\left(\frac{\sqrt{x^2 + y^2}}{R_c}\right)}\right) \quad (3)$$

Figure 7:
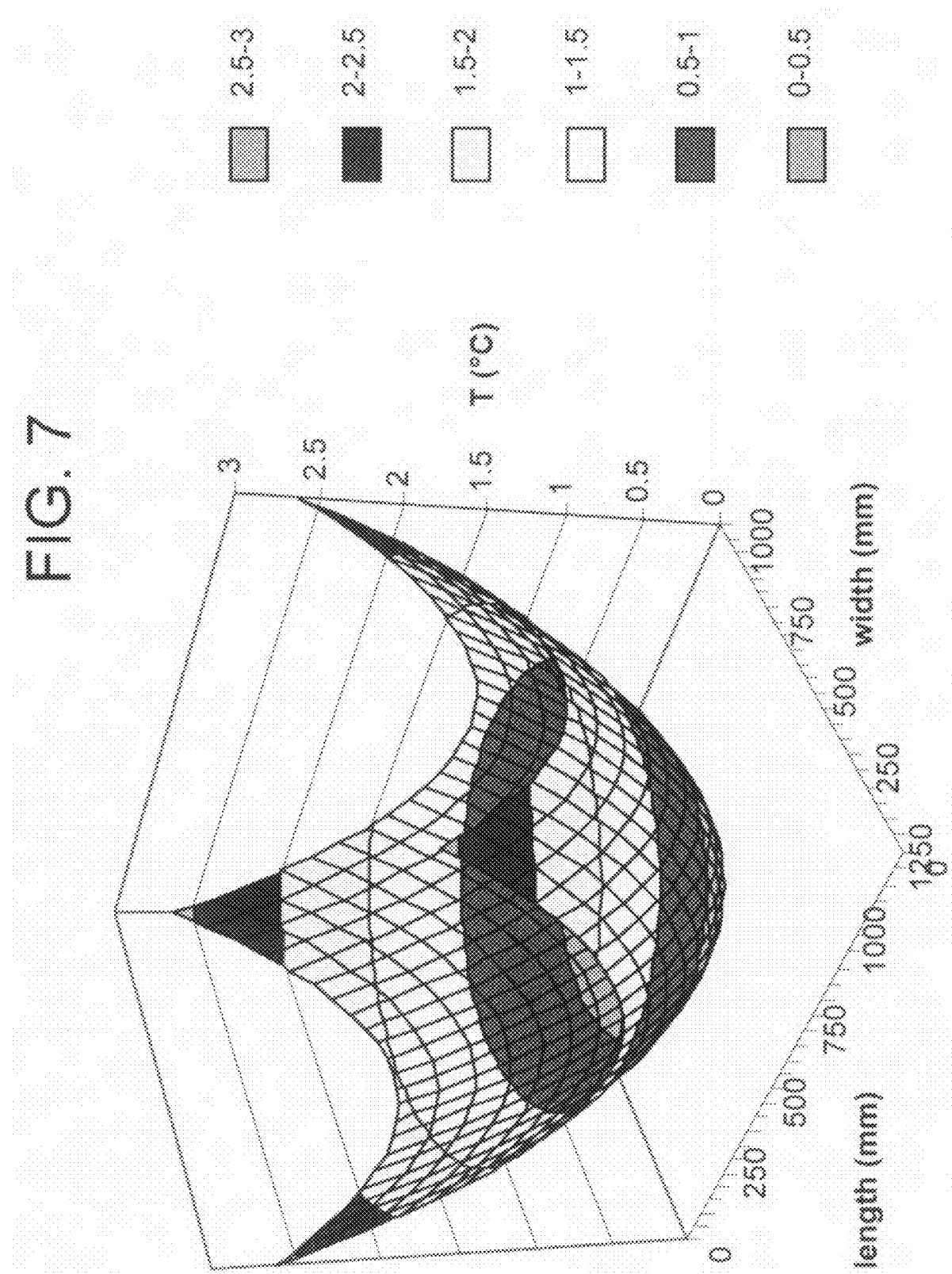
FIG. 7 is a drawing of a thermal profile which can be used to compensate for the shape-induced edge stresses of FIG. 4.
Figure 8:
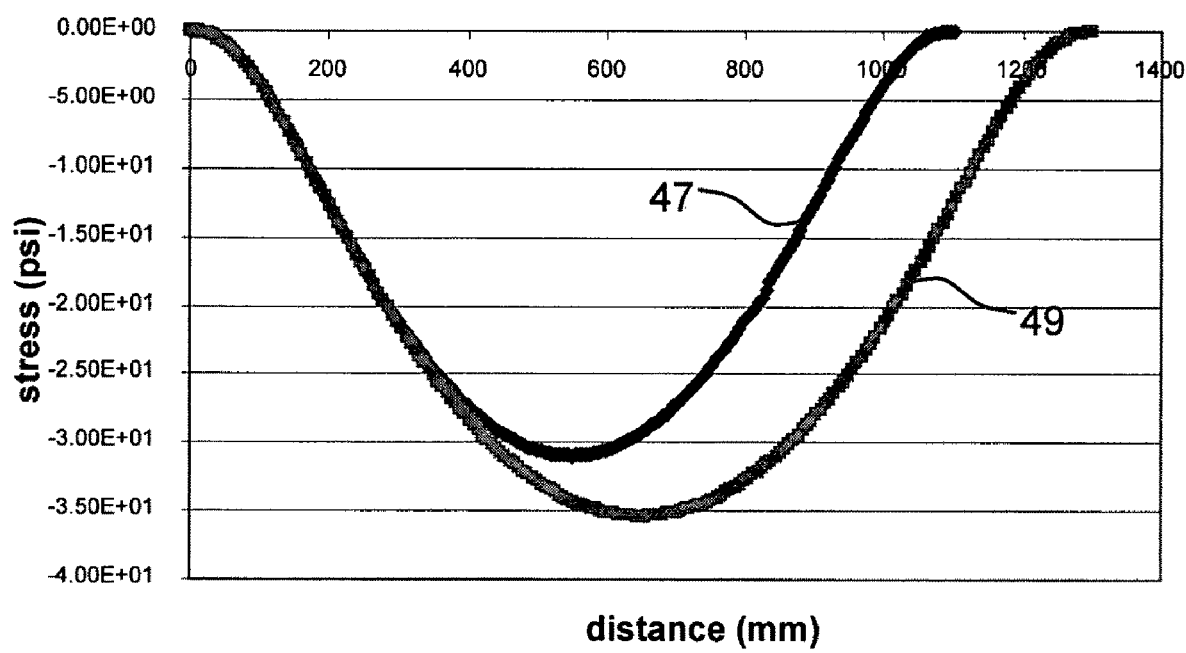
FIG. 8 is a drawing showing the thermal edge stresses produced by the thermal profile of FIG. 7.

FIG. 7 is a plot of the temperature distribution of Equation (3) and FIG. 8 is a plot of the calculated thermal stresses along the edges of the sheet associated with this temperature distribution (curve 47 is along the sheet's width; curve 49 is along its length). A comparison of FIG. 8 with FIG. 4 shows the exact cancellation of the shape-induced stress by the thermal stress distribution.

The thermal distribution of FIG. 7 is a two dimensional distribution which in general may be difficult to implement in practice.

Figure 9:
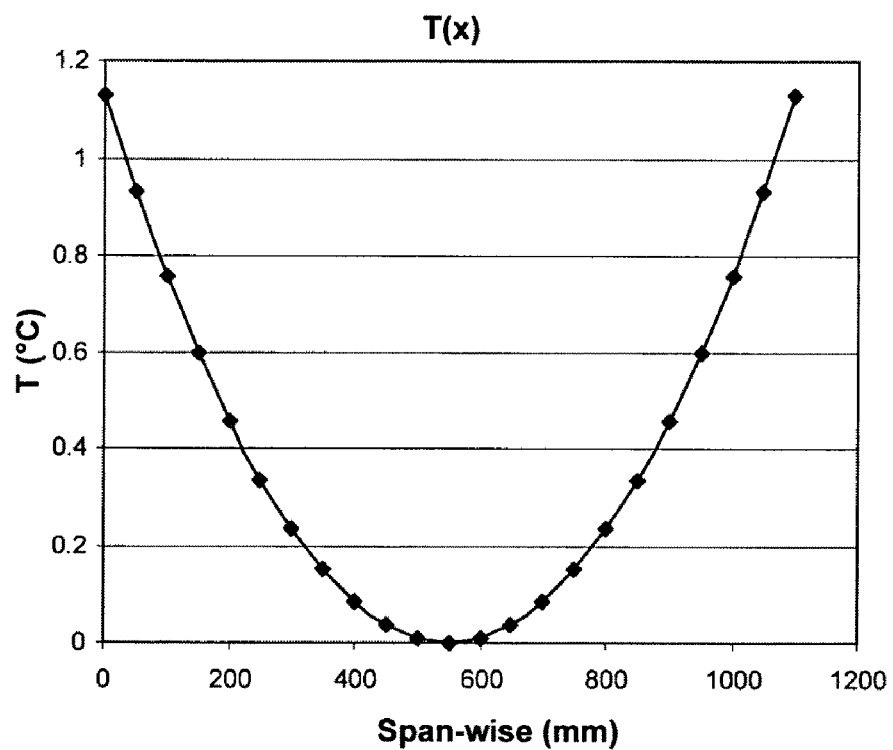
FIG. 9 is a drawing showing a one-dimensional thermal profile that can be used to partially compensate for the shape-induced edge stresses of FIG. 4.
Figure 10:
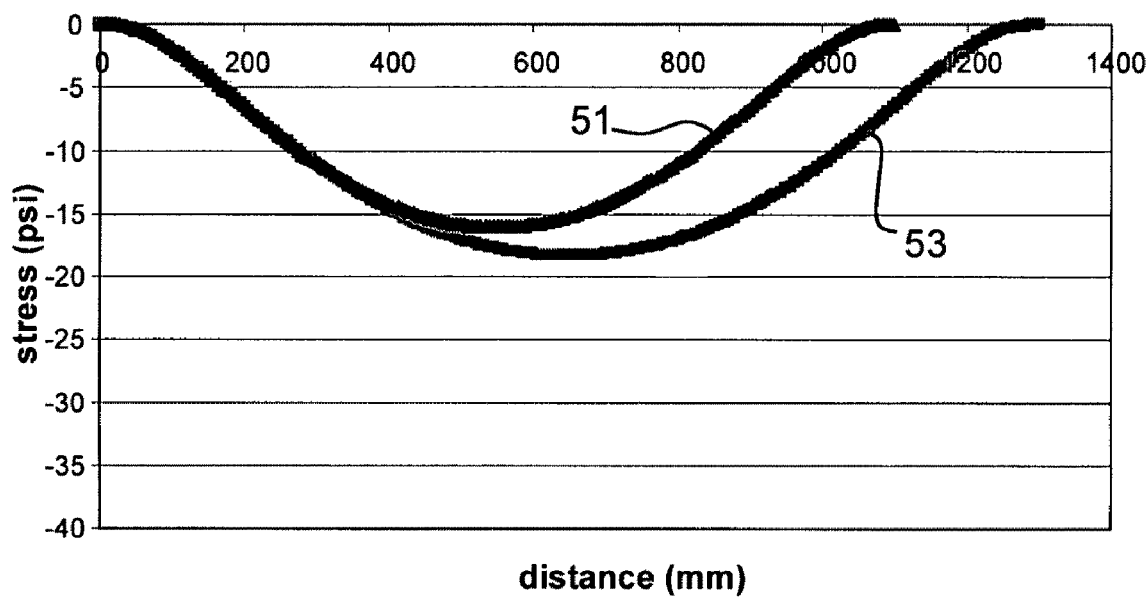
FIG. 10 is a drawing showing the thermal edge stresses produced by the thermal profile of FIG. 9.
Figure 11:
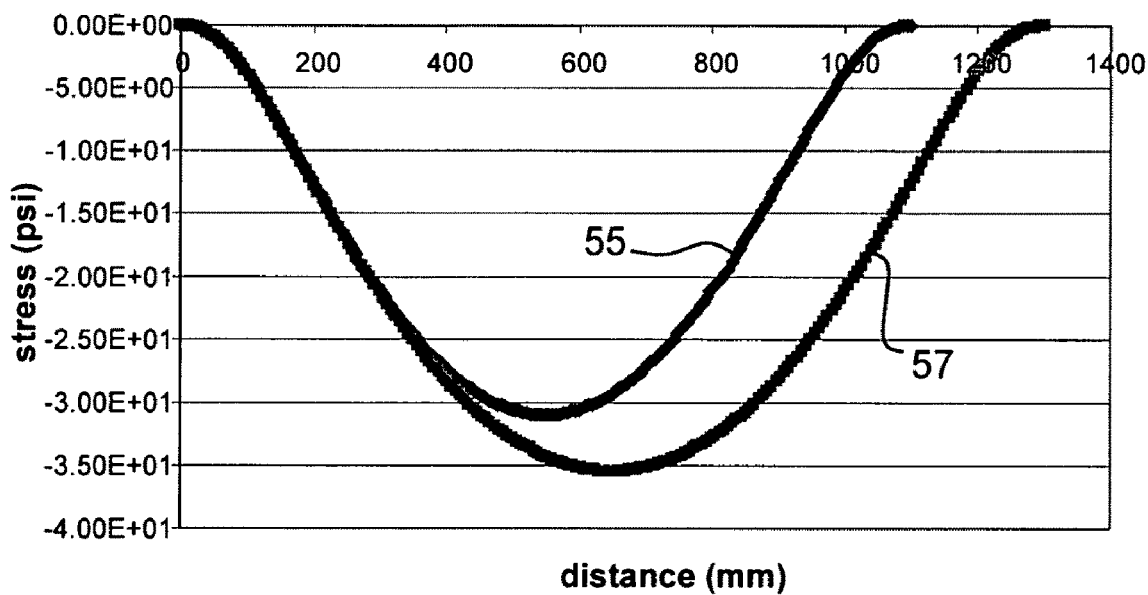
FIG. 11 is a drawing showing the thermal edge stresses produced by two times the thermal profile of FIG. 9.

FIGS. 9 through 11 show the results of studies performed using a one-dimensional temperature distribution across the width of the sheet which is applied along the entire length of the sheet (i.e., from y=0 through y=1300 mm in FIG. 5). The temperature distribution used in these figures corresponds to an across-the-ribbon temperature distribution which can be readily implemented in practice.

In particular, FIG. 9 shows the FIG. 7 across-the-ribbon temperature profile at y=0, and FIG. 10 shows the resulting calculated thermal stresses along the edges of the sheet associated with this temperature distribution (curve 51 is along the sheet's width; curve 53 is along its length). A comparison of this figure with FIG. 4 shows that only 50% cancellation is achieved. However, FIG. 11 shows that by simply doubling the one-dimensional temperature distribution, i.e., by using 2·T(x) of FIG. 9, cancellation of the edge stresses is achieved.

In particular, curves 55 and 57 of FIG. 11 show the calculated thermal edge stresses associated with the 2·T(x) temperature distribution along the width and length of the sheet, respectively. A comparison of these curves with those of FIG. 4 demonstrates the ability of a one-dimensional temperature distribution to cancel the shape-induced edge stresses associated with a spherically-shaped sheet.

EXAMPLE 2

Temperature Distributions which Compensate for Ellipsoidally-Shaped Sheets

This example extends the analysis of Example 1 to ellipsoidally-shaped sheets.

Figure 12:
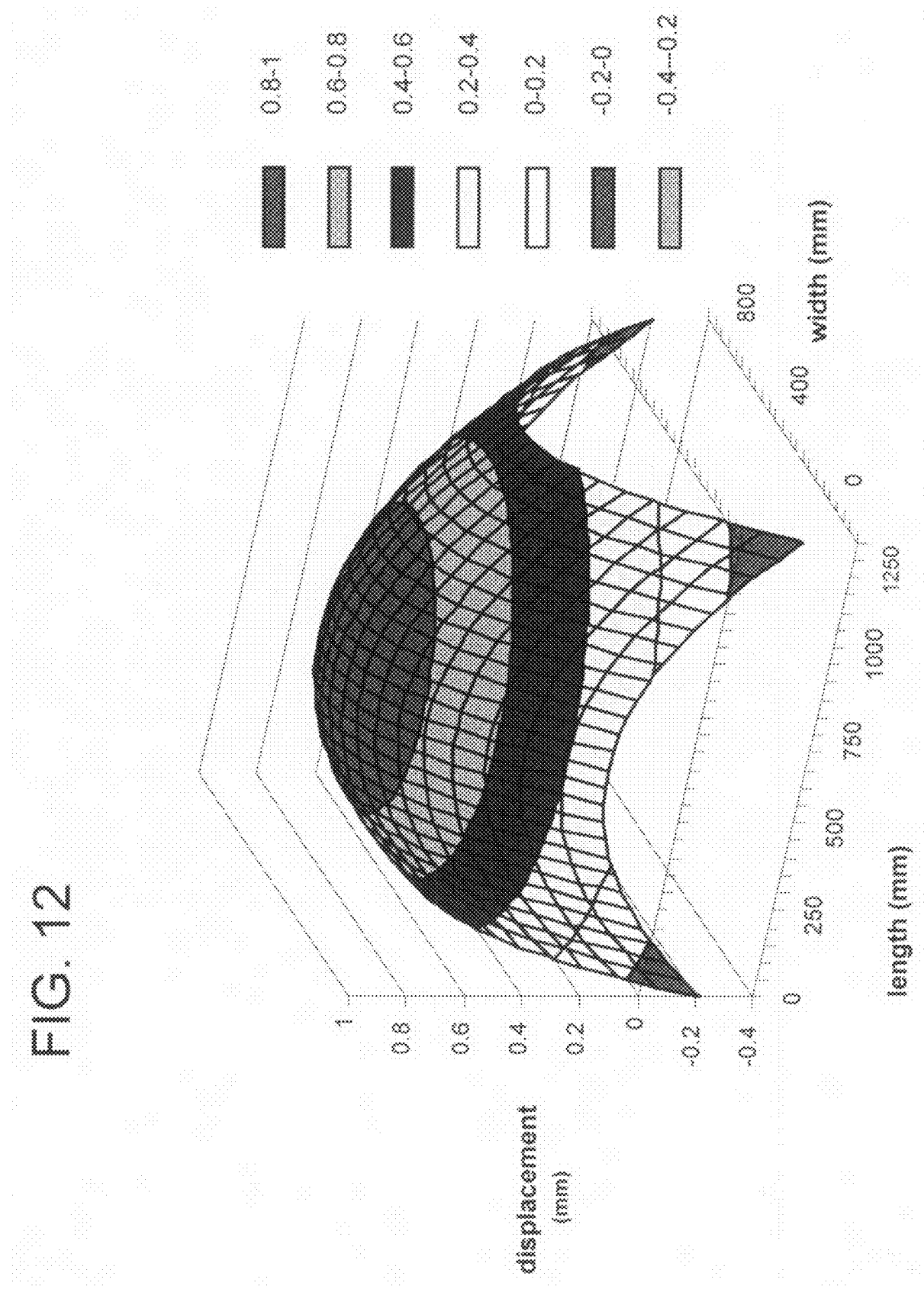
FIG. 12 is a drawing of a ellipsoidally-shaped glass sheet.

FIG. 12 shows a representative ellipsoidally-shaped sheet where the ratio (F) between the curvature of the sheet in the width direction to that in the length direction is 2.0.

Figure 13:
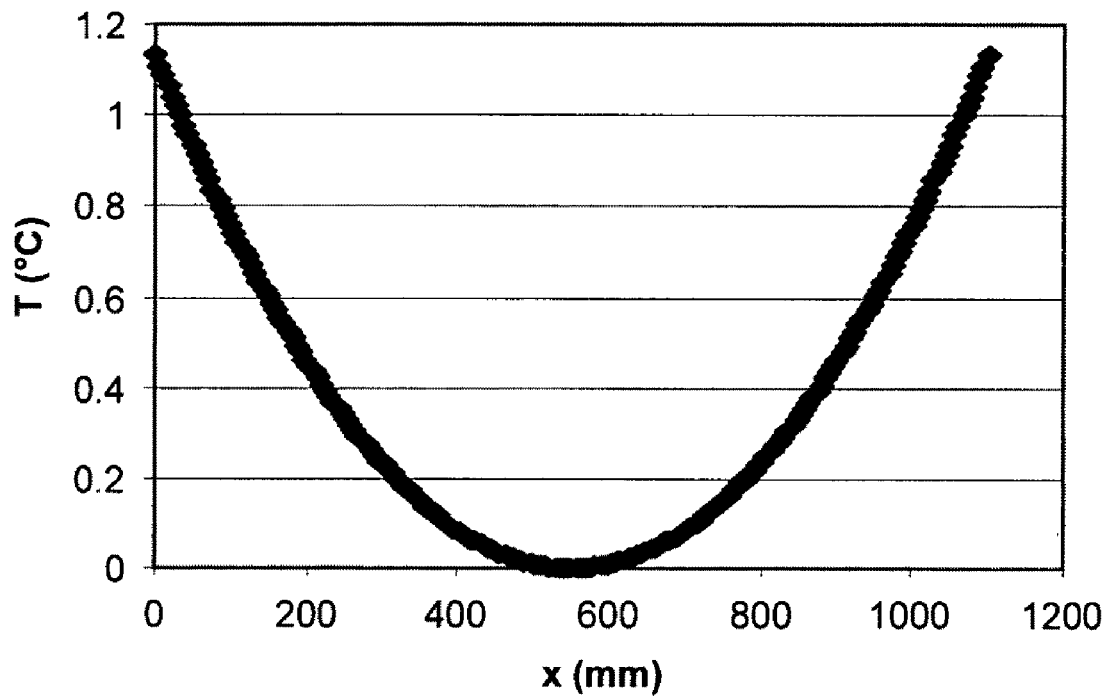
FIG. 13 is a drawing of a thermal profile (span-wise temperature variation) which can be used to compensate for the shape-induced edge stresses associated with the sheet of FIG. 12 when flattened.
Figure 14A:
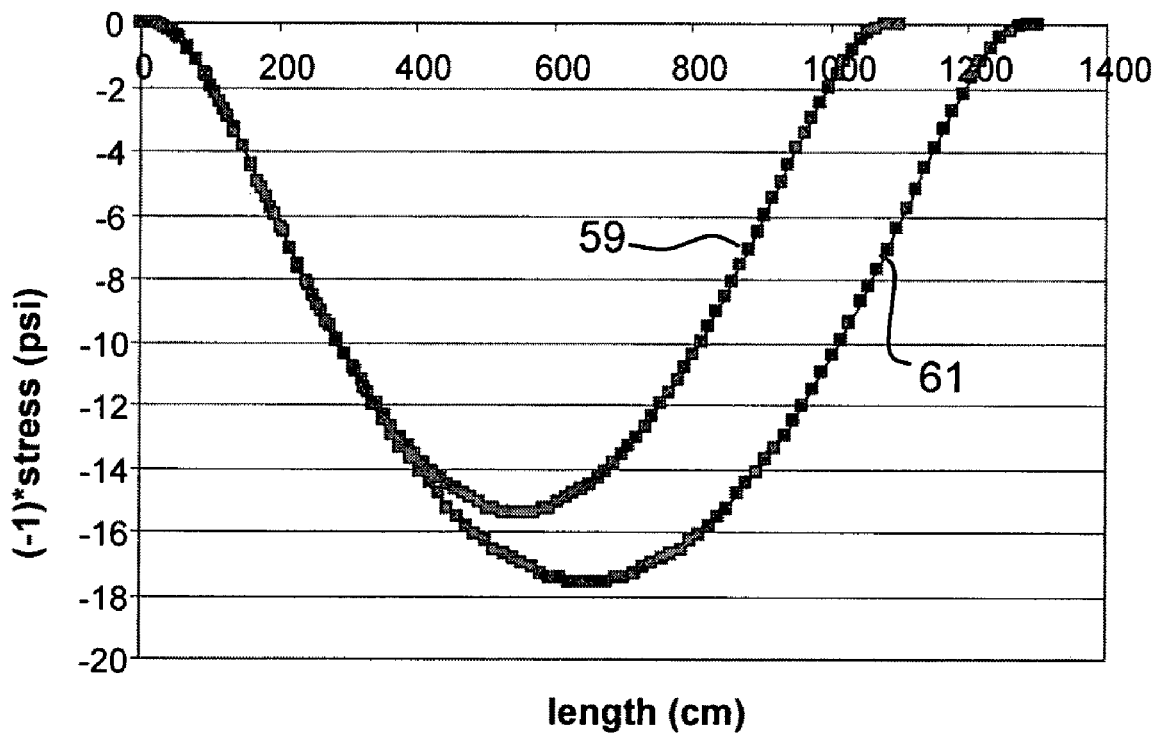
FIG. 14A is a drawing of the shape-induced edge stresses produced when the sheet of FIG. 12 is flattened.
Figure 14B:
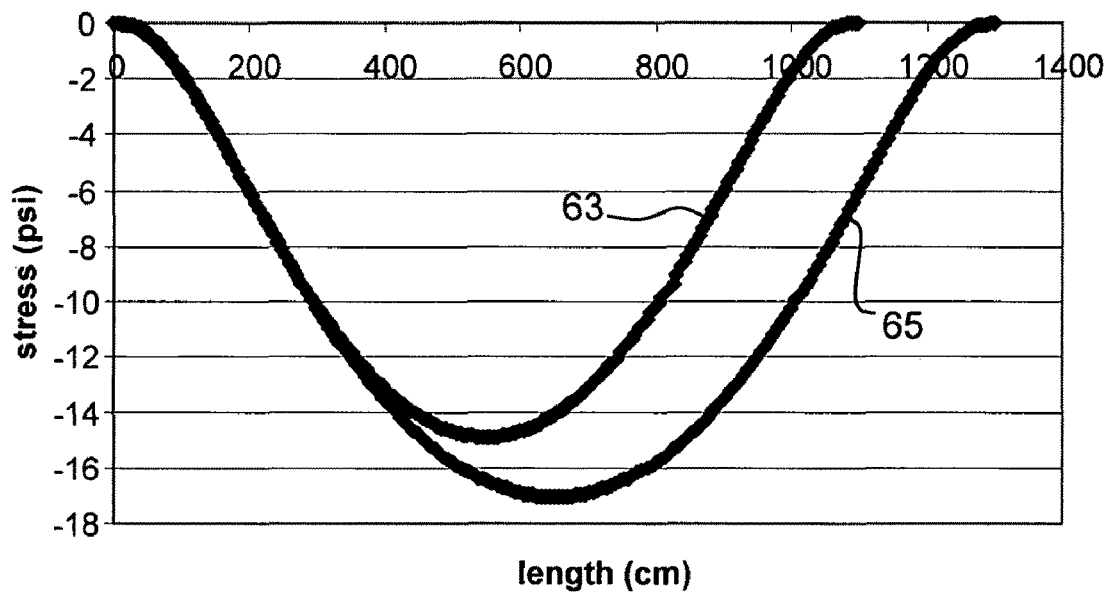
FIG. 14B is a drawing showing the thermal edge stresses produced by the thermal profile of FIG. 13.

FIG. 14A shows the edge stresses developed when the ellipsoid of FIG. 12 is flattened (curve 59 is along the sheet's width; curve 61 is along its length), and FIG. 14B shows the compensating thermal stresses produced by the thermal profile of FIG. 13 applied across the width of the ribbon. In particular, curves 63 and 65 in FIG. 14B show the compensating thermal stress along the sheet's width and length, respectively. As can be seen from a comparison of FIGS. 14A and 14B, the thermal profile of FIG. 13 achieves cancellation of the shape-induced edge stresses.

Figure 15:
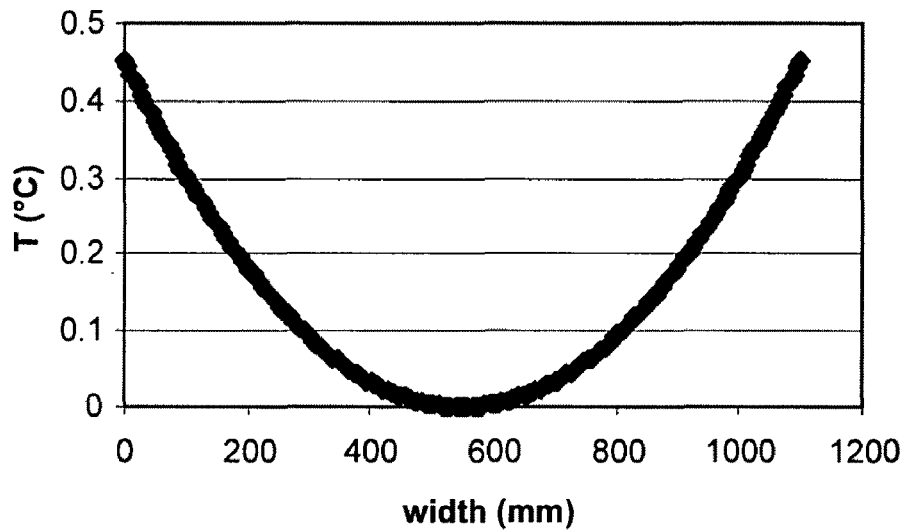
FIG. 15 is a drawing of a thermal profile which can be used to compensate for the shape-induced edge stresses associated with flattening an ellipsoidally-shaped sheet having an F ratio of 5.
Figure 16:
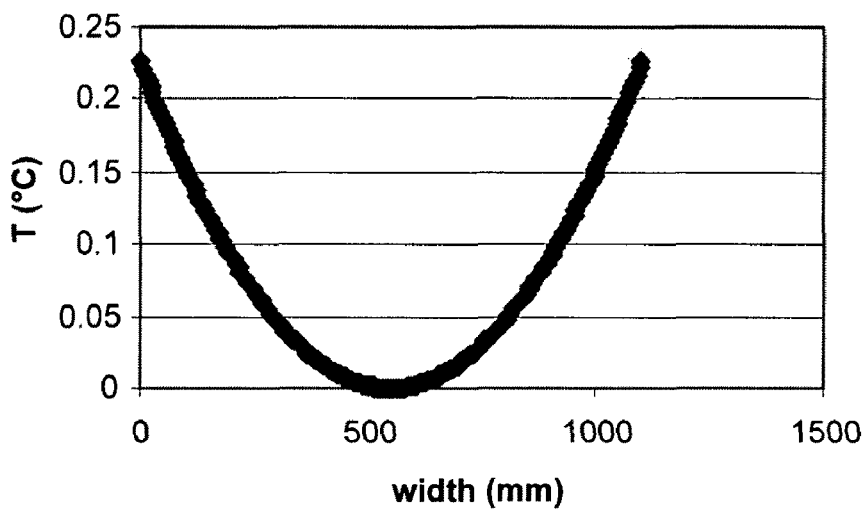
FIG. 16 is a drawing of a thermal profile which can be used to compensate for the shape-induced edge stresses associated with flattening an ellipsoidally-shaped sheet having an F ratio of 10.

FIGS. 15 and 16 show compensating thermal profiles for ellipsoids having F values of 5 and 10, respectively. As in the F=2 case of FIGS. 12 through 14, the thermal profiles of FIGS. 15 and 16 were found to produce cancellation of the shape-induced edge stresses associated with flattening of their respective ellipsoids (data not shown). A comparison of FIGS. 15 and 16 with each other and with FIG. 13 reveals that as the F value of the ellipsoid increases, the temperature differential across the ribbon needed to achieve cancellation becomes smaller for a given δ.

It should be noted that the temperature distributions of FIGS. 15 and 16, as well as those of FIGS. 7, 9, and 13, assume that the glass has a uniform CTE behavior across the width of the ribbon. Because the across-the-ribbon temperature differences are small, this is a reasonable assumption. Accordingly, the across-the-ribbon temperature distributions used in practice can, in general, be substantially those shown in these figures.

EXAMPLE 3

Decomposition into Components

Edge Stress Decomposition

This example illustrates how edge stress distributions can be decomposed into long-scale and short-scale variations.

Figure 17:
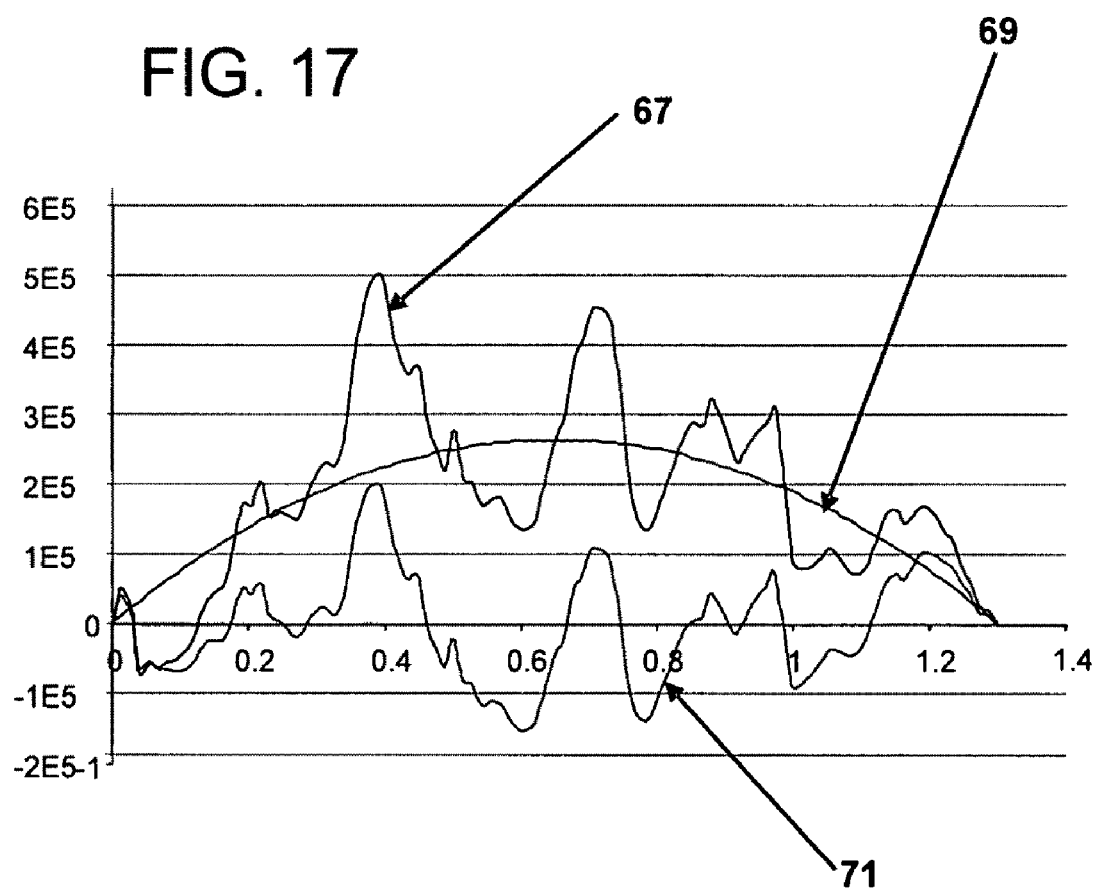
FIG. 17 illustrates the decomposition of an edge stress distribution into a long-scale (long range; low spatial frequency) component and a short-scale (short range; high spatial frequency) component. The vertical axis in FIG. 17 is stress in arbitrary units and the horizontal axis is distance along the edge of the glass sheet in meters.

FIG. 17 shows a representative in-plane, thickness-averaged, stress measurement along one edge of a glass sheet under vacuumed flat conditions (curve 67). The figure also shows a decomposition of that stress distribution into a long-scale component (low spatial frequency component) and a short-scale component (high spatial frequency component). Specifically, curve 69 shows a long-scale component, determined, for example, by fitting a parabola to curve 67. Curve 71 shows a short-scale component, determined by subtracting curve 69 from curve 67. Alternatively, the decomposition can be done as a Fourier series expansion.

Such decompositions can be used in various ways. For example, across-the-ribbon temperature distributions can be selected based on the long-scale (long range) stress distribution, which, as discussed above, normally has a greater effect than short-scale (short range) stress components on the distortion exhibited by sub-pieces cut from a glass sheet.

Although FIG. 17 illustrates decomposition for a stress measurement along one edge of a glass sheet, decomposition can also be used on two-dimensional stress distributions, on shape measurements obtained under gravity-free or substantially gravity-conditions, on stress distributions calculated from such shape measurements, on stress distributions calculated and/or measured along and/or in the vicinity of cut lines, and the like. In all these cases, the long range components will typically play a greater role in distortion than the short range components and thus in accordance with the invention, distortion compensation is preferably directed, at least in the first instance, to the long range components.

EXAMPLE 4

Determination of the Setting Zone Temperature Range

This example illustrates the determination of the setting zone temperature range (SZTR) for a particular glass composition (Corning Incorporated Code Eagle 2000 glass) for a representative drawing rate using the techniques discussed above in Section V(D)(3). In addition to the SZTR, values for the cSZTR, ssSZTR, and msSZTR are also determined for this glass and drawing rate.

A room temperature Young's modulus of $6.90 \times 10^{10}$ Pa along with the following Fulcher coefficients were used in the analysis: A=−30.8; B=64125.1; $T_0$=−323.6. The drawing rate for the ribbon was assumed to correspond to a cooling rate of 10° C./second.

As discussed above, the lower end of the SZTR is that temperature ($T_L$) which produces a SZP value of 55.8. Using the Fulcher coefficients set forth above and Eqs. F and G gives:

$$55.8 = (\eta_L) * 10/(6.90 \times 10^{10})$$

$$\ln(\eta_L) = -30.8 + 64125.1/(T_L + 323.6)$$

Solving these two equations for $T_L$ gives a temperature of 749° C. Following the same procedures for the upper end of the SZTR gives 806° C. The SZTR for Eagle 2000 glass is thus 749-806° C.

In the same manner, the following ranges were determined for this glass:
cSZTR—764-799° C.,
ssSZTR—778-788° C., and
msSZTR—783-784° C.

By applying across-the-ribbon temperature distributions at one or more positions in the above SZTR (preferably, the above cSZTR, more preferably, the above ssSZTR, and most preferably, the above msSZTR), the distortion exhibited by sub-pieces cut from substrates composed of Eagle 2000 glass is controlled.

VI. FEATURES OF THE INVENTION

In view of the foregoing, it can be seen that the features of the invention include, without limitation, the following:

1. A method for controlling the distortion exhibited by sub-pieces cut from glass sheets cut from a glass ribbon produced by a drawing process having a drawing rate, said glass having a setting zone temperature range for said drawing rate, said glass ribbon having a centerline, and said method comprising:

(a) determining an across-the-ribbon shape for the ribbon at one or more longitudinal positions along the ribbon where the glass at the centerline of the ribbon has a temperature within the setting zone temperature range, and (b) producing an across-the-ribbon temperature distribution at one or more longitudinal positions along the ribbon based on at least one of the one or more across-the-ribbon shapes determined in step (a) so that a population of glass sheets cut from the ribbon has, for each sheet in the population, a maximum distortion of 2 microns for sub-pieces cut from the sheet, where each sheet in the population has an area greater than or equal to 0.25 square meters.

2. The method of Feature 1 wherein at least one of the one or more longitudinal positions of step (a) is a position where the glass at the centerline of the ribbon has a temperature within the cSZTR (preferably within the ssSZTR, more preferably within the msSZTR).

3. The method of Feature 1 wherein at least one of the one or more longitudinal positions of step (b) is at a position along the ribbon where the glass at the centerline of the ribbon has a temperature within the setting zone temperature range.

4. The method of Feature 3 wherein at least one of the one or more longitudinal positions of step (b) is at a position along the ribbon where the glass at the centerline of the ribbon has a temperature within the setting zone temperature range (preferably within the cSZTR, more preferably within the ssSZTR, and most preferably within the msSZTR).

5. The method of Feature 1 wherein at least one of the one or more longitudinal positions of step (b) is the same as one of the one or more longitudinal positions of step (a).

6. The method of Feature 1 wherein at least one of the one or more across-the-ribbon shapes determined in step (a) comprises a plurality of shape components and at least one of the one or more across-the-ribbon temperature distributions produced in step (b) is selected based on a decomposition of said at least one across-the-ribbon shape into its shape components.

7. The method of Feature 6 wherein:

(i) said shape components comprise at least a first shape component and a second shape component;

(ii) the first shape component has a first spatial frequency content and the second shape component has a second spatial frequency content;

(iii) the first spatial frequency content corresponds to lower spatial frequencies than the second spatial frequency content; and (iv) at least one of the one or more across-the-ribbon temperature distributions produced in step (b) is based on said first shape component.

8. The method of Feature 1 wherein at least one of the one or more across-the-ribbon shapes determined in step (a) comprises a developable shape component and a non-developable shape component and at least one of the one or more across-the-ribbon temperature distributions produced in step (b) is based on said non-developable shape component.

9. The method of Feature 1 wherein at least one of the one or more across-the-ribbon shapes determined in step (a) is filtered to remove at least some spatial frequencies and at least one of the one or more across-the-ribbon temperature distributions produced in step (b) is based on said filtered shape.

10. The method of Feature 9 wherein the ribbon has an across-the-ribbon width W and at least some spatial frequencies above $4/W$ are removed by filtering.

11. The method of Feature 1 wherein at least one of the one or more across-the-ribbon shapes determined in step (a) is based on a stress, shape, and/or in-plane shape change measurement performed on one or more glass sheets cut from the ribbon and/or on distortion measurements performed on one or more sub-pieces cut from one or more glass sheets.

12. The method of Feature 1 wherein:

(i) the drawing process comprises a series of substantially identical cycles, each cycle extending from the cutting of one glass sheet to the cutting of the next glass sheet from the ribbon;

(ii) during each cycle, the shape of the ribbon varies as a function of time; and (iii) at least one of the one or more across-the-ribbon shapes determined in step (a) is determined as a function of time.

13. The method of Feature 1 wherein the drawing process is a fusion downdraw process.

14. The method of Feature 1 wherein the drawing process is a float process.

15. The method of Feature 1 wherein at least one of the across-the-ribbon temperature distributions is produced using a cooling bayonet which has a non-uniform diameter and/or a non-uniform emissivity along its length.

16. A method for controlling the distortion exhibited by sub-pieces cut from glass sheets cut from a glass ribbon produced by a drawing process having a drawing rate, said glass having a setting zone temperature range, said glass ribbon having a centerline, and said method comprising producing an across-the-ribbon temperature distribution at one or more longitudinal positions along the ribbon where the glass at the centerline of the ribbon has a temperature within the setting zone temperature range based on a representative shape for the glass sheets under substantially gravity-free conditions so that a population of glass sheets cut from the ribbon has, for each sheet in the population, a maximum distortion of 2 microns for sub-pieces cut from the sheet, where each sheet in the population has an area greater than or equal to 0.25 square meters.

17. The method of Feature 16 wherein at least one of the one or more longitudinal positions is at a position along the ribbon where the glass at the centerline of the ribbon has a temperature within the cSZTR (preferably within the ssSZTR, more preferably within the msSZTR).

18. The method of Feature 16 wherein at least one of the across-the-ribbon temperature distributions is produced using a cooling bayonet which has a non-uniform diameter and/or a non-uniform emissivity along its length.

19. A method for controlling the distortion exhibited by sub-pieces cut from glass sheets cut from a glass ribbon produced by a drawing process having a drawing rate, said glass ribbon having a centerline and said method comprising:

(i) determining a setting zone temperature range for the glass for said drawing rate; and (ii) producing an across-the-ribbon temperature distribution at one or more longitudinal positions along the ribbon where the glass at the centerline of the ribbon has a temperature within the setting zone temperature range based on a representative stress distribution for the glass sheets under vacuumed flat conditions so that a population of glass sheets cut from the ribbon has, for each sheet in the population, a maximum distortion of 2 microns for sub-pieces cut from the sheet, where each sheet in the population has an area greater than or equal to 0.25 square meters.

20. The method of Feature 19 wherein at least one of the across-the-ribbon temperature distributions is produced using a cooling bayonet which has a non-uniform diameter and/or a non-uniform emissivity along its length.

21. A method for producing sheets of glass using a glass manufacturing process that produces a ribbon of glass, said glass cooling along the length of the ribbon such that the glass passes through a setting zone temperature range (the "SZTR"), said method comprising:
   (a) producing at least one sheet of glass under a set of operating conditions that comprises target temperature values for at least one longitudinal position along the length of the ribbon where the glass is passing through the SZTR, said target temperature values being at locations that are distributed across the width of the ribbon (the "across-the-ribbon locations");
   (b) measuring one or more of the following for the at least one sheet produced under said set of operating conditions:
      (i) stress values at a plurality of spatially-separated locations on the sheet and/or on one or more sub-pieces cut from the sheet while the sheet and/or the sub-pieces are vacuumed onto a plane surface (the "stress values"),
      (ii) deviation-from-a-flat-plane values of the sheet and/or of one or more sub-pieces cut from the sheet under gravity-free or substantially gravity-free conditions (the "gravity-free deviation-from-a-flat-plane values"),
      (iii) deviation-from-a-flat-plane values of the sheet and/or of one or more sub-pieces cut from the sheet under gravity conditions (the "gravity deviation-from-a-flat-plane values"), and
      (iv) in-plane shape change values for the sheet and/or distortion values for one or more sub-pieces cut from the sheet (the "shape change/distortion values");
   (c) comparing the measured values of step (b) with one or more distortion criteria and/or one or more surrogate distortion criteria;
   (d) determining revised target temperature values for across-the-ribbon locations at least one longitudinal position along the length of the ribbon where the glass is passing through the SZTR using:
      (i) the comparison with the one or more distortion criteria and/or the one or more surrogate distortion criteria, and
      (ii) a computer model that is capable of relating changes in an across-the-ribbon thermal distribution to changes in predicted stresses and/or strains in the glass ribbon and/or in a glass sheet cut from the ribbon;
   (e) producing at least one sheet of glass using the revised target temperature values determined in step (d);
   (f) measuring one or more of the following for the at least one sheet produced in step (e): (i) stress values, (ii) gravity-free deviation-from-a-plane values, (iii) gravity deviation-from-a-plane values, and (iv) shape change/distortion values; and
   (g) comparing the measured values of step (f) with the one or more distortion criteria and/or the one or more surrogate distortion criteria, and, if necessary, repeating steps (d) through (f), one or more times, using the same at least one longitudinal position and/or at least one different longitudinal position along the length of the ribbon.

22. The method of Feature 21 wherein steps (d) through (f) are repeated until at least one longitudinal position and target temperature values at said position are determined which produce measured values which satisfy the one or more distortion criteria and/or the one or more surrogate distortion criteria.

23. The method of Feature 21 wherein the at least one longitudinal position comprises a position where the glass is passing through the cSZTR (preferably through the ssSZTR, more preferably through the msSZTR).

24. The method of Feature 21 wherein measured values are decomposed into spatial components and those decomposed values are used in determining target temperature values.

25. The method of Feature 24 wherein:
   (i) said spatial components comprise at least a first spatial component and a second spatial component;
   (ii) the first spatial component has a first spatial frequency content and the second spatial component has a second spatial frequency content;
   (iii) the first spatial frequency content corresponds to lower spatial frequencies than the second spatial frequency content; and
   (iv) the first spatial component is used in determining target temperature values.

26. The method of Feature 21 wherein measured values are decomposed based on a developable spatial component and a non-developable spatial component and the decomposed values based on the non-developable spatial component are used in determining target temperature values.

27. The method of Feature 21 wherein measured values are filtered to remove at least some spatial frequencies and the filtered values are used in determining target temperature values.

28. The method of Feature 27 wherein the ribbon has an across-the-ribbon width W and at least some spatial frequencies above 4/W are removed by filtering.

29. The method of Feature 21 wherein the measured values are mean values for a population of sheets produced in step (a) and/or step (e).

30. The method of Feature 21 wherein the computer model employs equations of the following form or a non-linear version of said equations:

$$\frac{\partial^2 \epsilon_{xx}}{\partial y \partial z} = \frac{\partial}{\partial x}\left(-\frac{\partial \epsilon_{yz}}{\partial x} + \frac{\partial \epsilon_{xx}}{\partial y} + \frac{\partial \epsilon_{xy}}{\partial z}\right)$$

$$\frac{\partial^2 \epsilon_{yy}}{\partial z \partial x} = \frac{\partial}{\partial y}\left(-\frac{\partial \epsilon_{xz}}{\partial y} + \frac{\partial \epsilon_{xy}}{\partial z} + \frac{\partial \epsilon_{yz}}{\partial x}\right)$$

$$\frac{\partial^2 \epsilon_{zz}}{\partial x \partial y} = \frac{\partial}{\partial z}\left(-\frac{\partial \epsilon_{xy}}{\partial z} + \frac{\partial \epsilon_{yz}}{\partial x} + \frac{\partial \epsilon_{xz}}{\partial y}\right)$$

$$2\frac{\partial^2 \epsilon_{xy}}{\partial x \partial y} = \frac{\partial^2 \epsilon_{xx}}{\partial y^2} + \frac{\partial^2 \epsilon_{yy}}{\partial x^2}$$

$$2\frac{\partial^2 \epsilon_{yz}}{\partial y \partial z} = \frac{\partial^2 \epsilon_{yy}}{\partial x^2} + \frac{\partial^2 \epsilon_{zz}}{\partial y^2}$$

$$2\frac{\partial^2 \epsilon_{xz}}{\partial z \partial x} = \frac{\partial^2 \epsilon_{zz}}{\partial x^2} + \frac{\partial^2 \epsilon_{xx}}{\partial z^2}$$

$$\tilde{\epsilon}_{xx} = \epsilon_{xx} - \alpha T$$

$$\tilde{\epsilon}_{yy} = \epsilon_{yy} - \alpha T$$

$$\tilde{\epsilon}_{zz} = \epsilon_{zz} - \alpha T$$

$$\tilde{\epsilon}_{xy} = \epsilon_{xy}$$

$$\tilde{\epsilon}_{yz} = \epsilon_{yx}$$

-continued $$\tilde{\epsilon}_{xz} = \epsilon_{xz}$$

$$\tilde{\epsilon}_{xx} = \frac{1}{E}(\sigma_{xx} - \nu(\sigma_{yy} + \sigma_{zz}))$$

$$\tilde{\epsilon}_{yy} = \frac{1}{E}(\sigma_{yy} - \nu(\sigma_{xx} + \sigma_{zz}))$$

$$\tilde{\epsilon}_{zz} = \frac{1}{E}(\sigma_{zz} - \nu(\sigma_{xx} + \sigma_{yy}))$$

$$\tilde{\epsilon}_{xy} = \frac{1-\nu}{E}\sigma_{xy}$$

$$\tilde{\epsilon}_{xz} = \frac{1-\nu}{E}\sigma_{xz}$$

$$\tilde{\epsilon}_{yz} = \frac{1-\nu}{E}\sigma_{yz}$$

where $\epsilon$ is total strain, $\tilde{\epsilon}$ is elastic strain, $\alpha$ is a coefficient of thermal expansion, T is a temperature difference from a base temperature at which thermal strains are zero, $\sigma_{ij}$ is stress, $\epsilon_{ij}$ is total strain, E is Young's modulus, $\nu$ is Poisson's ratio, and x,y,z are rectangular coordinates.

31. The method of Feature 21 wherein the ribbon is produced by a fusion downdraw process.

32. The method of Feature 21 wherein the ribbon is produced by a float process.

33. A method for producing sheets of glass using a glass manufacturing process that produces a ribbon of glass, said manufacturing process having a drawing rate and said method comprising:

(a) determining a setting zone temperature range (SZTR) for the glass for said drawing rate;

(b) producing at least one sheet of glass under a set of operating conditions that comprises target temperature values for at least one longitudinal position along the length of the ribbon where the glass is passing through the SZTR (preferably through the cSZTR, more preferably through the ssSZTR, and most preferably through the msSZTR), said target temperature values being at locations that are distributed across the width of the ribbon (the "across-the-ribbon locations");

(c) measuring one or more of the following for the at least one sheet produced under said set of operating conditions:
(i) stress values at a plurality of spatially-separated locations on the sheet and/or on one or more sub-pieces cut from the sheet while the sheet and/or the sub-pieces are vacuumed onto a plane surface (the "stress values"),
(ii) deviation-from-a-flat-plane values of the sheet and/or of one or more sub-pieces cut from the sheet under gravity-free or substantially gravity-free conditions (the "gravity-free deviation-from-a-flat-plane values"),
(iii) deviation-from-a-flat-plane values of the sheet and/or of one or more sub-pieces cut from the sheet under gravity conditions (the "gravity deviation-from-a-flat-plane values"), and
(iv) in-plane shape change values for the sheet and/or distortion values for one or more sub-pieces cut from the sheet (the "shape change/distortion values");

(d) comparing the measured values of step (c) with one or more distortion criteria and/or one or more surrogate distortion criteria;

(e) determining revised target temperature values for across-the-ribbon locations at least one longitudinal position along the length of the ribbon where the glass is passing through the SZTR (preferably through the cSZTR, more preferably through the ssSZTR, and most preferably through the msSZTR) using the comparison with the one or more distortion criteria and/or the one or more surrogate distortion criteria;

(f) producing at least one sheet of glass using the revised target temperature values determined in step (e);

(g) measuring one or more of the following for the at least one sheet produced in step (f): (i) stress values, (ii) gravity-free deviation-from-a-plane values, (iii) gravity deviation-from-a-plane values, and (iv) shape change/distortion values; and (h) comparing the measured values of step (g) with the one or more distortion criteria and/or the one or more surrogate distortion criteria, and, if necessary, repeating steps (e) through (g), one or more times, using the same at least one longitudinal position and/or at least one different longitudinal position along the length of the ribbon.

34. The method of Feature 33 wherein steps (e) through (g) are repeated until at least one longitudinal position and target temperature values at said position are determined which produce measured values which satisfy the one or more distortion criteria and/or the one or more surrogate distortion criteria.

35. The method of Feature 33 wherein measured values are decomposed into spatial components and those decomposed values are used in determining target temperature values.

36. The method of Feature 35 wherein:
(i) said spatial components comprise at least a first spatial component and a second spatial component;
(ii) the first spatial component has a first spatial frequency content and the second spatial component has a second spatial frequency content;
(iii) the first spatial frequency content corresponds to lower spatial frequencies than the second spatial frequency content; and
(iv) the first spatial component is used in determining target temperature values.

37. The method of Feature 33 wherein measured values are decomposed based on a developable spatial component and a non-developable spatial component and the decomposed values based on the non-developable spatial component are used in determining target temperature values.

38. The method of Feature 33 wherein measured values are filtered to remove at least some spatial frequencies and the filtered values are used in determining target temperature values.

39. The method of Feature 38 wherein the ribbon has an across-the-ribbon width W and at least some spatial frequencies above 4/W are removed by filtering.

40. The method of Feature 33 wherein the measured values are mean values for a population of sheets produced in step (b) and/or step (f).

41. The method of Feature 33 wherein the ribbon is produced by a fusion downdraw process.

42. The method of Feature 33 wherein the ribbon is produced by a float process.

43. A method for controlling the distortion exhibited by sub-pieces cut from glass sheets cut from a glass ribbon produced by a drawing process comprising:

(a) obtaining one dimensional or two-dimensional data for glass sheets and/or sub-pieces produced by the process;

(b) decomposing said data into components, said components comprising at least a first component and a second component, wherein:
(i) the first component has a first spatial frequency content and the second component has a second spatial frequency content; and (ii) the first spatial frequency content corresponds to lower spatial frequencies than the second spatial frequency content; and (c) using the first component in the selection of at least one process parameter used in the drawing process.

44. The method of Feature 43 wherein the data is shape data.

45. The method of Feature 43 wherein the data is stress data.

46. The method of Feature 43 wherein the at least one process parameter is an across-the-ribbon temperature distribution.

Although specific embodiments of the invention have been described and illustrated, it is to be understood that modifications can be made without departing from the invention's spirit and scope. For example, although the invention has been discussed above primarily in terms of a fusion downdraw process, it is equally applicable to a float process where again a glass ribbon is formed and passes through a SZTR as it is cooled.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

APPENDIX A

Equations for Thermal Stress

The stresses and strains in the sheet must satisfy the following sets of field equations.

Compatibility $$\frac{\partial^2 \epsilon_{xx}}{\partial y \partial z} = \frac{\partial}{\partial x}\left(-\frac{\partial \epsilon_{yz}}{\partial x} + \frac{\partial \epsilon_{xz}}{\partial y} + \frac{\partial \epsilon_{xy}}{\partial z}\right) \quad (1)$$

$$\frac{\partial^2 \epsilon_{yy}}{\partial z \partial x} = \frac{\partial}{\partial y}\left(-\frac{\partial \epsilon_{xz}}{\partial y} + \frac{\partial \epsilon_{xy}}{\partial z} + \frac{\partial \epsilon_{yz}}{\partial x}\right)$$

$$\frac{\partial^2 \epsilon_{zz}}{\partial x \partial y} = \frac{\partial}{\partial z}\left(-\frac{\partial \epsilon_{xy}}{\partial z} + \frac{\partial \epsilon_{yz}}{\partial x} + \frac{\partial \epsilon_{xz}}{\partial y}\right)$$

$$2\frac{\partial^2 \epsilon_{xy}}{\partial x \partial y} = \frac{\partial^2 \epsilon_{xx}}{\partial y^2} + \frac{\partial^2 \epsilon_{yy}}{\partial x^2}$$

$$2\frac{\partial^2 \epsilon_{yz}}{\partial y \partial z} = \frac{\partial^2 \epsilon_{yy}}{\partial x^2} + \frac{\partial^2 \epsilon_{zz}}{\partial y^2}$$

$$2\frac{\partial^2 \epsilon_{xz}}{\partial z \partial x} = \frac{\partial^2 \epsilon_{zz}}{\partial x^2} + \frac{\partial^2 \epsilon_{xx}}{\partial z^2}$$

where $\epsilon$ is the total strain, subscripts denote components in the conventional manner, and x,y,z are rectangular coordinates. See, for example, Sokolnikoff, I. S., 1956, Mathematical Theory of Elasticity, Robert E. Krieger Publishing Company, Malabar, Fla. The compatibility equations express that the displacement field be continuous. That is, they express that holes do not form in the body, and that the same space is not occupied by more than one part of the body.

In an elastic model, the total strain is the sum of the elastic and thermal strains. The elastic strains $\tilde{\epsilon}$ are:

$$\tilde{\epsilon}_{xx} = \epsilon_{xx} - \alpha T$$

$$\tilde{\epsilon}_{yy} = \epsilon_{yy} - \alpha T$$

$$\tilde{\epsilon}_{zz} = \epsilon_{zz} - \alpha T$$

$$\tilde{\epsilon}_{xy} = \epsilon_{xy}$$

$$\tilde{\epsilon}_{yz} = \epsilon_{yz}$$

$$\tilde{\epsilon}_{xz} = \epsilon_{xz} \quad (2)$$

where $\alpha$ is the coefficient of thermal expansion, taken to be isotropic here, and T is the temperature difference from the base temperature at which thermal strains are zero. Note that T can be a function of spatial location.

Constitutive Law $$\tilde{\epsilon}_{xx} = \frac{1}{E}(\sigma_{xx} - \nu(\sigma_{yy} + \sigma_{zz})) \quad (3)$$

$$\tilde{\epsilon}_{yy} = \frac{1}{E}(\sigma_{yy} - \nu(\sigma_{xx} + \sigma_{zz}))$$

$$\tilde{\epsilon}_{zz} = \frac{1}{E}(\sigma_{zz} - \nu(\sigma_{xx} + \sigma_{yy}))$$

$$\tilde{\epsilon}_{xy} = \frac{1-\nu}{E}\sigma_{xy}$$

$$\tilde{\epsilon}_{xz} = \frac{1-\nu}{E}\sigma_{xz}$$

$$\tilde{\epsilon}_{yz} = \frac{1-\nu}{E}\sigma_{yz}$$

where $\sigma_{ij}$ is the stress, E the Young's modulus, and $\nu$ the Poisson's ratio. E and $\nu$ can be functions of temperature. This set of equations describes the stress-strain behavior of the material, which is taken to be linear elastic, although it could be visco-elastic, if desired.

Equilibrium $$\frac{\partial \sigma_{xx}}{\partial x} + \frac{\partial \sigma_{xy}}{\partial y} + \frac{\partial \sigma_{xz}}{\partial z} = 0 \quad (4)$$

$$\frac{\partial \sigma_{xy}}{\partial x} + \frac{\partial \sigma_{yy}}{\partial y} + \frac{\partial \sigma_{yz}}{\partial z} = 0$$

$$\frac{\partial \sigma_{xz}}{\partial x} + \frac{\partial \sigma_{yz}}{\partial y} + \frac{\partial \sigma_{zz}}{\partial z} = 0$$

To find the thermally induced stresses, the preceding sets of coupled equations are solved, along with the boundary conditions and a given temperature distribution. The boundary conditions can, for example, treat the sheet as being free of external forces. Alternatively, the boundary conditions can include the application of an external force, e.g., an outwardly directed external force and/or a twisting force, at one or more longitudinal positions along the length of the ribbon.

If the thermal strains satisfy compatibility by themselves, the total strain can simply be the thermal strain, and there will be no stress. For example, if the thermal strains are uniform, or if they have a uniform gradient, they satisfy compatibility by themselves, so there will be no stresses. When the thermal strains do not satisfy compatibility, elastic (or visco-elastic) strains enter the picture, such that the total strain satisfies compatibility.

The model can be implemented using the ANSYS finite element software. The preceding sets of equations and procedures to solve them, are built into ANSYS. The geometry, material properties (E, $\nu$, $\alpha$) as functions of temperature, and the temperature distribution are specified to the ANSYS software.

The preceding equations are for the linear case: infinitesimal strains, linear elastic material behavior, and small displacements. However, in some of the cases of interest, there can be a geometrical non-linearity. For example, the strains can be infinitesimal and the material behavior can be linear elastic, but the displacements can be large enough to require non-linear analysis.

In such non-linear cases, the equations to be solved are more complicated than the linear equations given above, but are available in many textbooks, such as, Malvern, L. E., *Introduction to the Mechanics of a Continuous Medium*, Prentice-Hall, Inc., 1969; Belytschko, T., Liu, W. K., Moran, B., *Nonlinear Finite Elements for Continua and Structures*, John Wiley & Sons, Ltd., 2000; and Dhondt, G., *The Finite Element Method for Three-Dimensional Thermomechanical Applications*, John Wiley & Sons, Ltd., 2004.

Further, ANSYS, and many other commercially available finite element software packages, have the non-linear equations, and the procedures to solve them, built-in. For example, in ANSYS, the command NLGEOM,ON is used in conjunction with elements that support non-linear behavior (for example, SHELL181 elements) to specify that the non-linear equations are the ones to be solved.

What is claimed is:

1. A method for controlling the distortion exhibited by sub-pieces cut from glass sheets cut from a glass ribbon produced by a drawing process having a drawing rate, said glass having a setting zone parameter, hereinafter referred to as SZP, given by:

$$(\eta \cdot \text{Cooling Rate} \cdot {}^\circ C^{-1})/E$$

where E is the Young's modulus of the glass, $\eta$ is the viscosity of the glass as a function of temperature, and the Cooling Rate is determined between the softening point and the annealing point of the glass, said glass further having a setting zone temperature range, hereinafter referred to as SZTR, said SZTR being the temperature range for which the SZP satisfies the relationship $2.7 \leq SZP \leq 55.8$, said glass ribbon having a centerline, and said method comprising:

(a) determining an across-the-ribbon shape for the ribbon at one or more longitudinal positions along the ribbon where the glass at the centerline of the ribbon has a temperature within the SZTR, and (b) producing an across-the-ribbon temperature distribution at one or more longitudinal positions along the ribbon based on at least one of the one or more across-the-ribbon shapes determined in step (a) so that a population of glass sheets cut from the ribbon has, for each sheet in the population, a maximum distortion of 2 microns for sub-pieces cut from the sheet, where each sheet in the population has an area greater than or equal to 0.25 square meters.

2. The method of claim 1 wherein the glass has a sweet spot temperature range, hereinafter referred to as ssSZTR, within the SZTR, the ssSZTR being the temperature range for which the SZP satisfies the relationship $6.9 \leq SZP \leq 11.8$, and at least one of the one or more longitudinal positions of step (a) is a position where the glass at the centerline of the ribbon has a temperature within the ssSZTR.

3. The method of claim 1 wherein at least one of the one or more longitudinal positions of step (b) is the same as one of the one or more longitudinal positions of step (a).

4. The method of claim 1 wherein at least one of the one or more across-the-ribbon shapes determined in step (a) comprises a plurality of shape components and at least one of the one or more across-the-ribbon temperature distributions produced in step (b) is selected based on a decomposition of said at least one across-the-ribbon shape into its shape components.

5. The method of claim 4 wherein:
(i) said shape components comprise at least a first shape component and a second shape component;
(ii) the first shape component has a first spatial frequency content and the second shape component has a second spatial frequency content;
(iii) the first spatial frequency content corresponds to lower spatial frequencies than the second spatial frequency content; and
(iv) at least one of the one or more across-the-ribbon temperature distributions produced in step (b) is based on said first shape component.

6. The method of claim 1 wherein at least one of the one or more across-the-ribbon shapes determined in step (a) comprises a developable shape component and a non-developable shape component and at least one of the one or more across-the-ribbon temperature distributions produced in step (b) is based on said non-developable shape component.

7. The method of claim 1 wherein at least one of the one or more across-the-ribbon shapes determined in step (a) is filtered to remove at least some spatial frequencies and at least one of the one or more across-the-ribbon temperature distributions produced in step (b) is based on said filtered shape.

8. The method of claim 1 wherein at least one of the one or more across-the-ribbon shapes determined in step (a) is based on a stress, shape, and/or in-plane shape change measurement performed on one or more glass sheets cut from the ribbon and/or on distortion measurements performed on one or more sub-pieces cut from one or more glass sheets.

9. The method of claim 1 wherein:
(i) the drawing process comprises a series of substantially identical cycles, each cycle extending from the cutting of one glass sheet to the cutting of the next glass sheet from the ribbon;
(ii) during each cycle, the shape of the ribbon varies as a function of time; and
(iii) at least one of the one or more across-the-ribbon shapes determined in step (a) is determined as a function of time.

* * * * *